June 12, 1962 B. F. MIESSNER 3,038,363
ELECTRONIC PIANO
Original Filed June 22, 1950 13 Sheets-Sheet 1
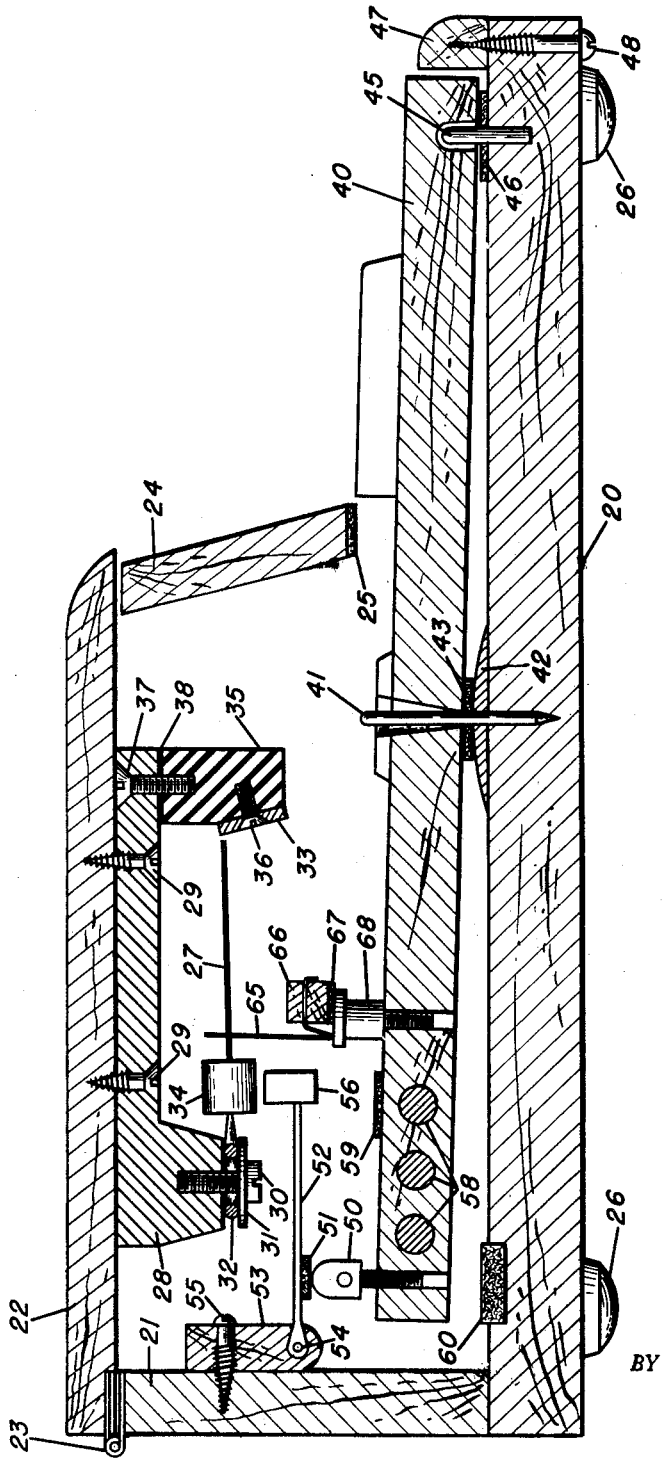
BENJAMIN F. MIESSNER
INVENTOR.
BY Rudolph J. Jurick
ATTORNEY June 12, 1962    B. F. MIESSNER    3,038,363
ELECTRONIC PIANO
Original Filed June 22, 1950    13 Sheets-Sheet 2
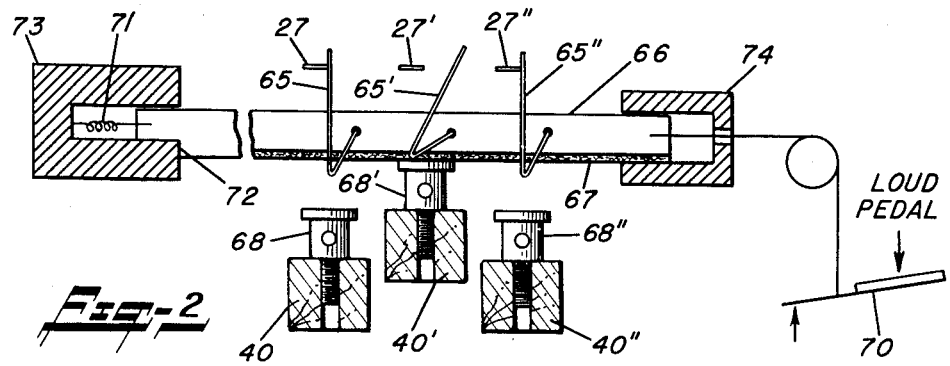
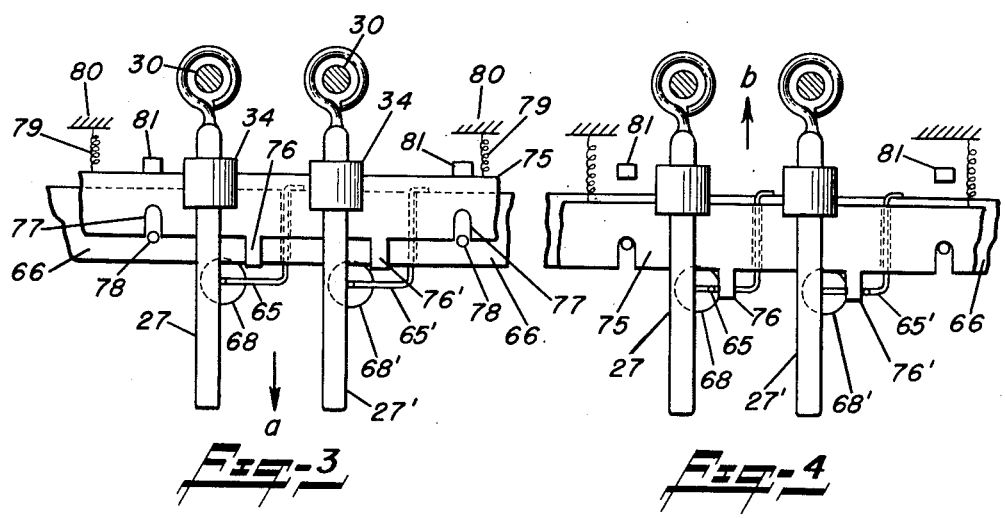
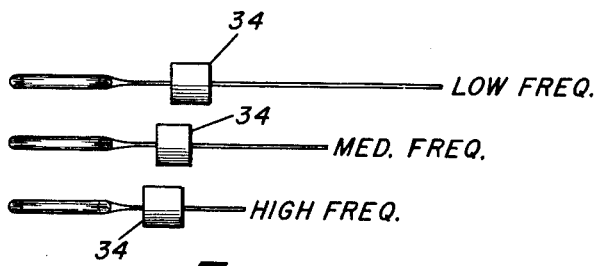
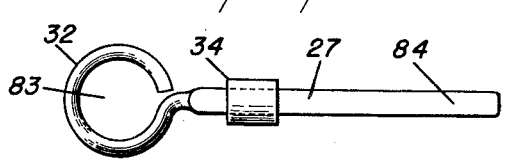
BENJAMIN F. MIESSNER
INVENTOR.
BY Rudolph J. Jurick
ATTORNEY

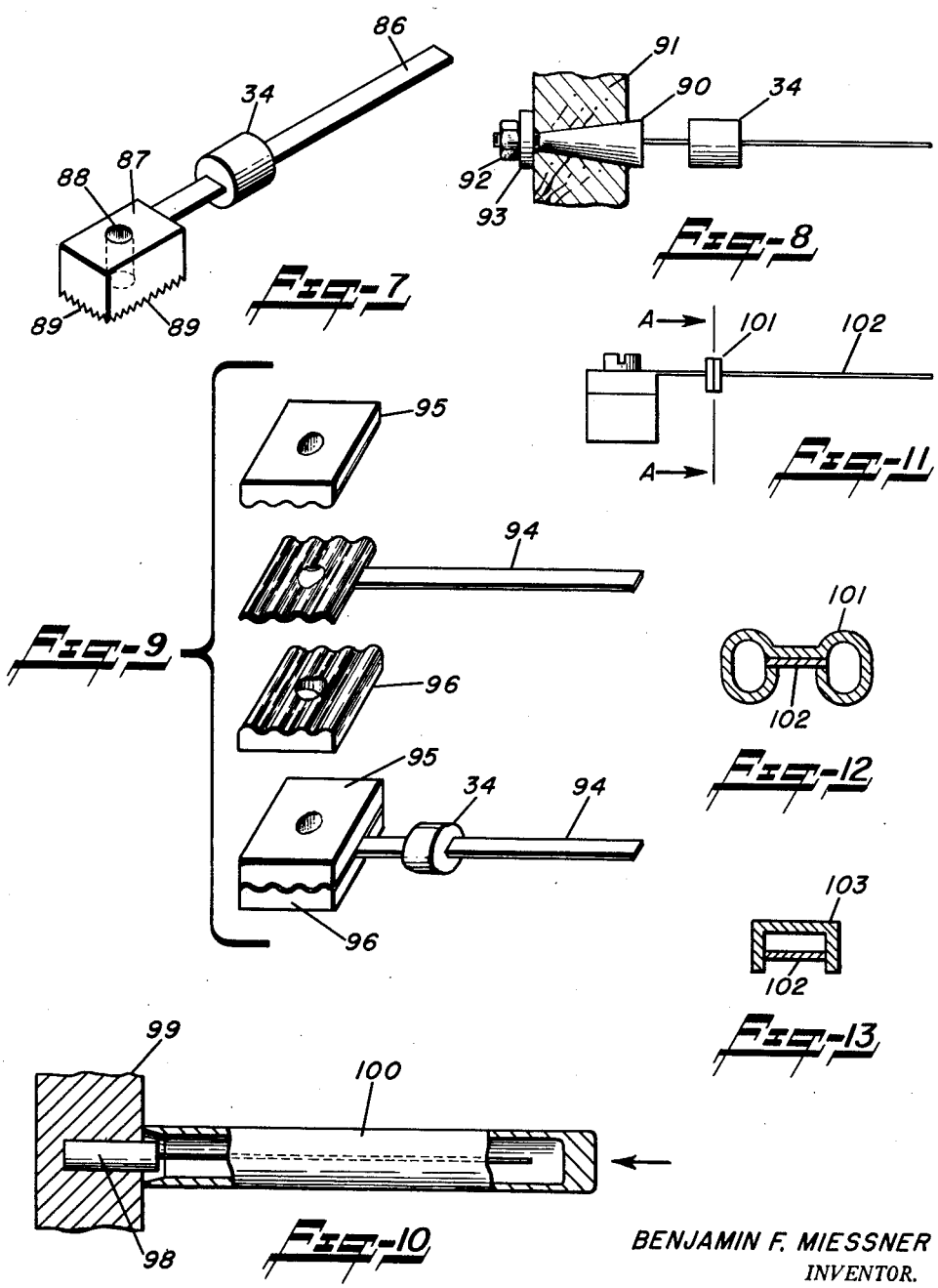

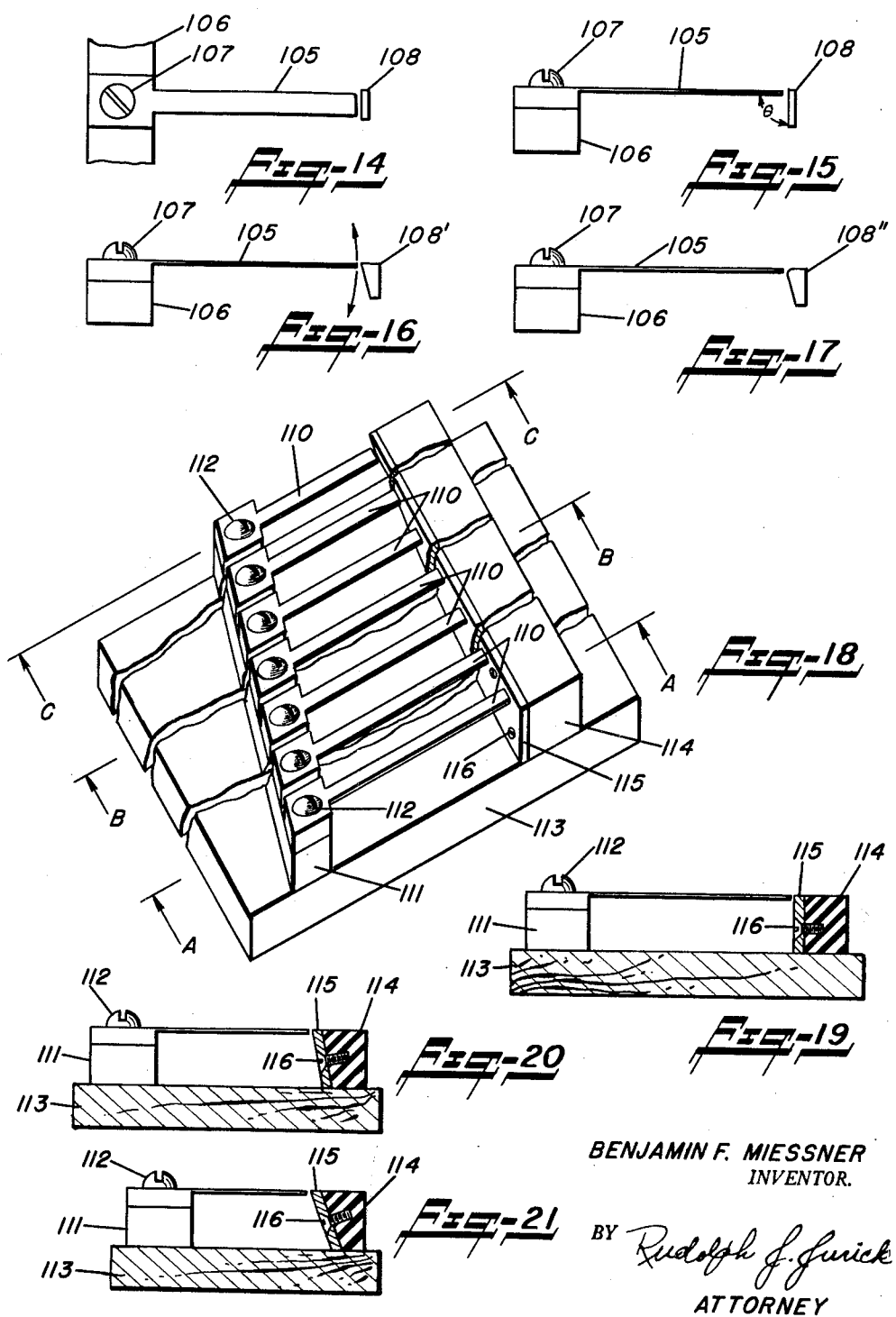

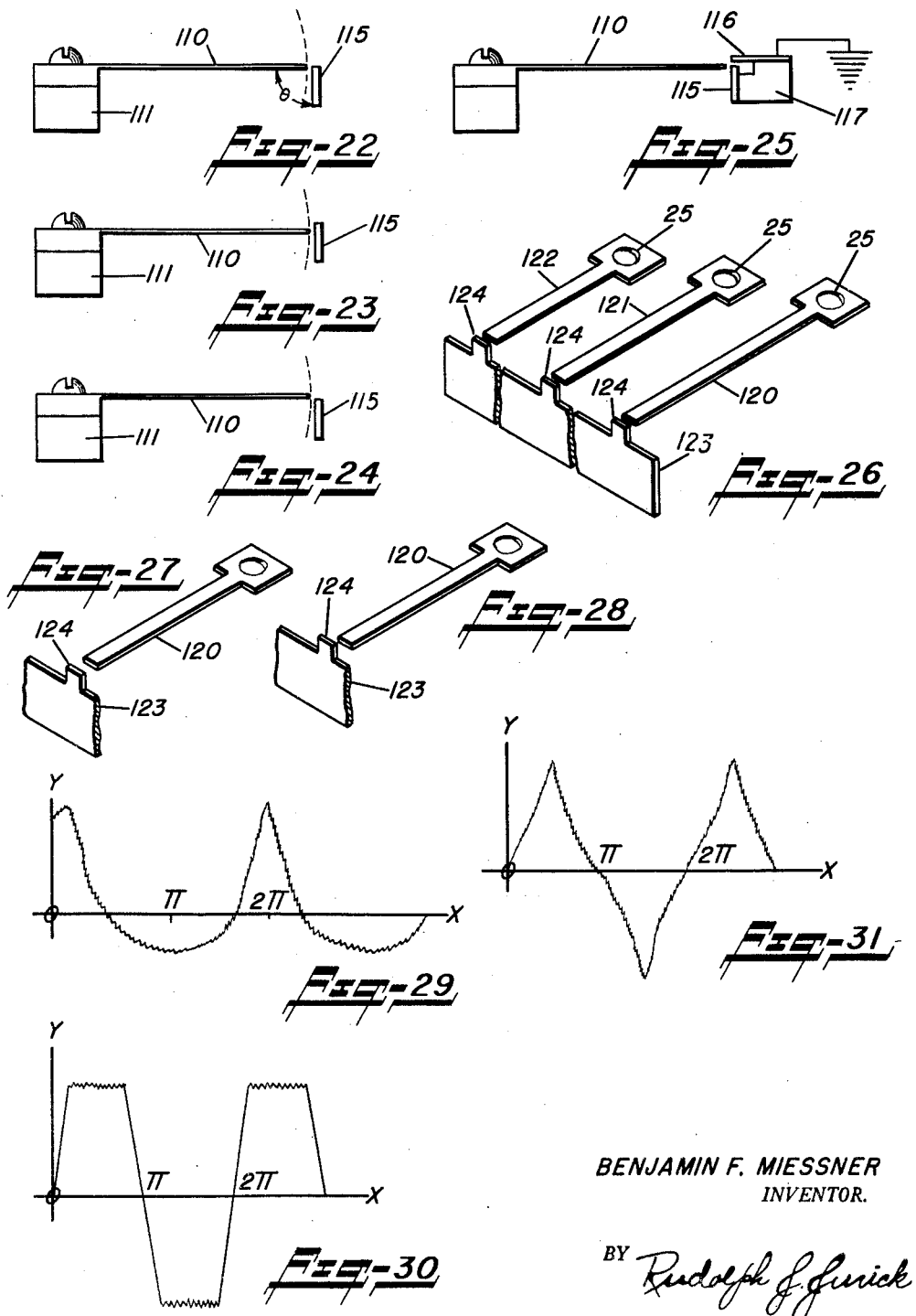

June 12, 1962     B. F. MIESSNER     3,038,363
ELECTRONIC PIANO
Original Filed June 22, 1950     13 Sheets-Sheet 6
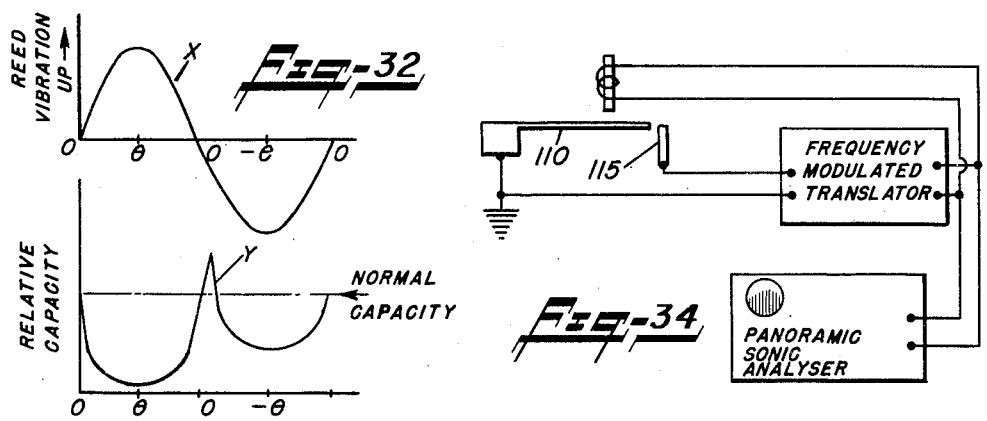
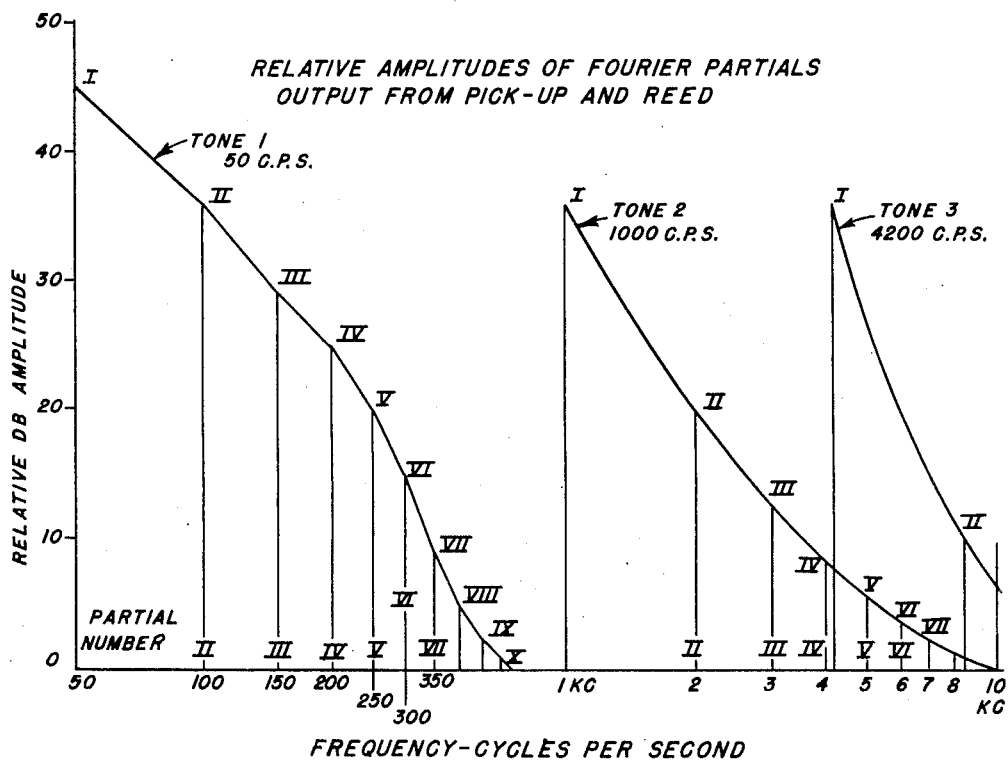
BENJAMIN F. MIESSNER
INVENTOR.
BY Rudolph J. Jurick
ATTORNEY

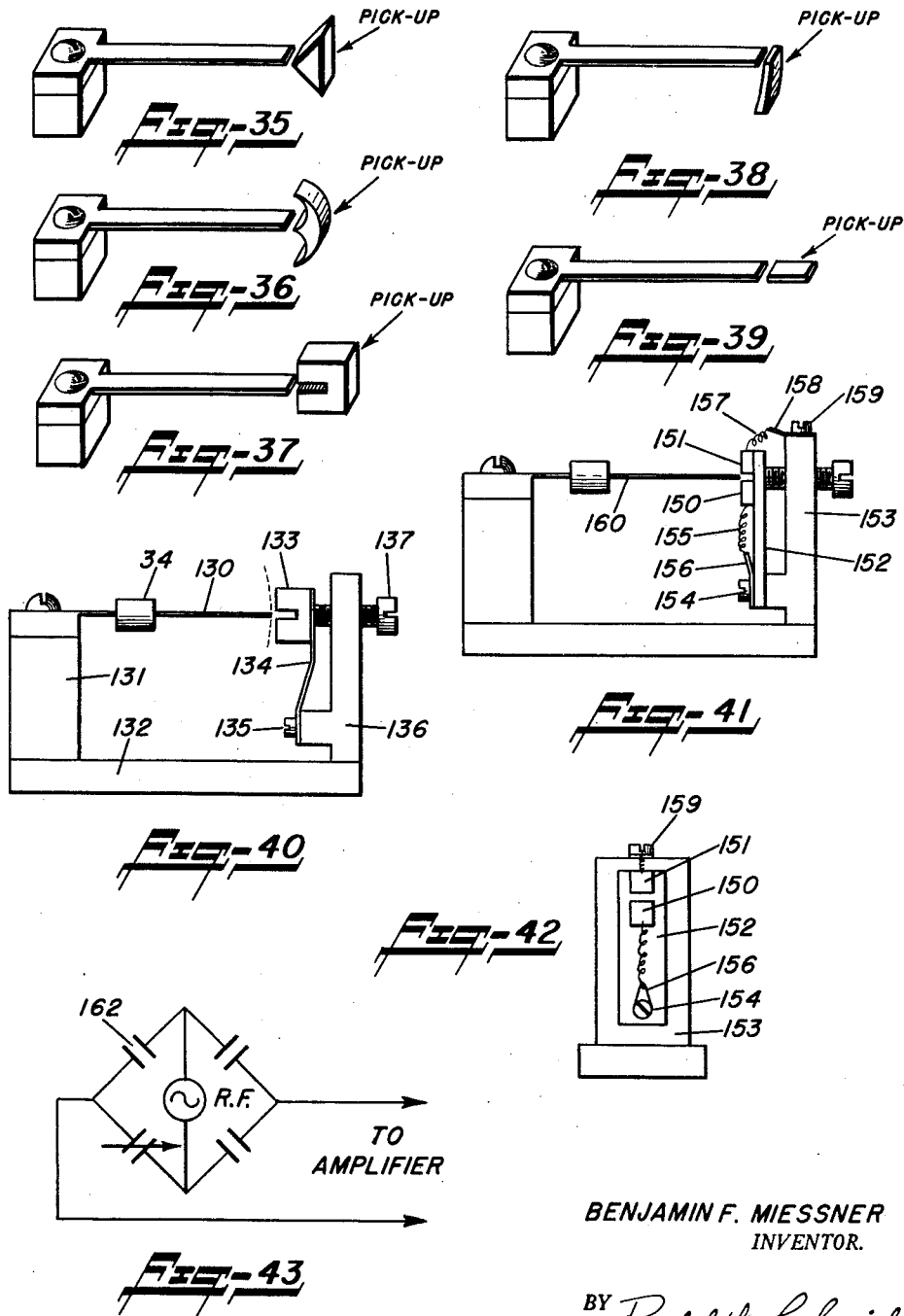

June 12, 1962  B. F. MIESSNER  3,038,363
ELECTRONIC PIANO
Original Filed June 22, 1950  13 Sheets-Sheet 8
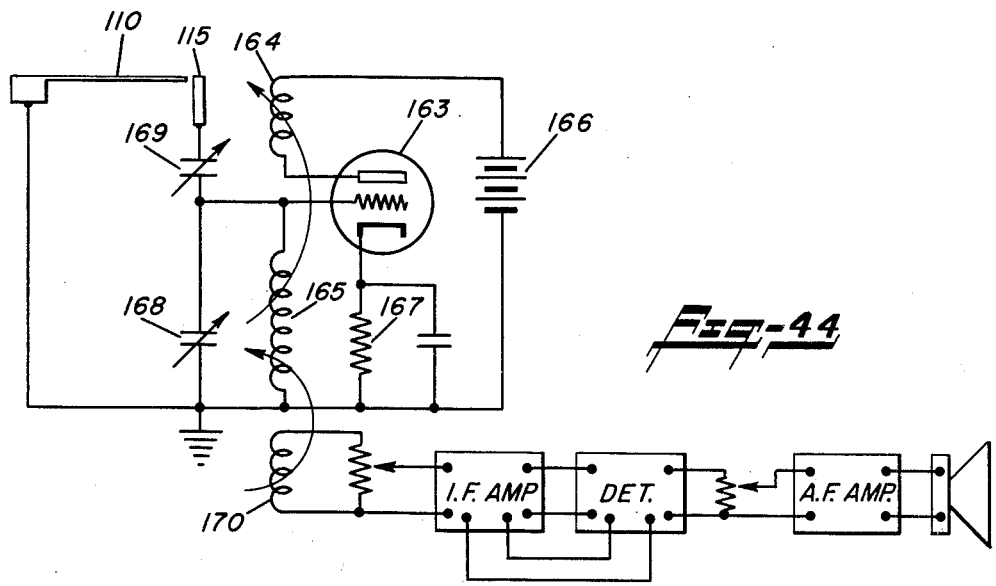
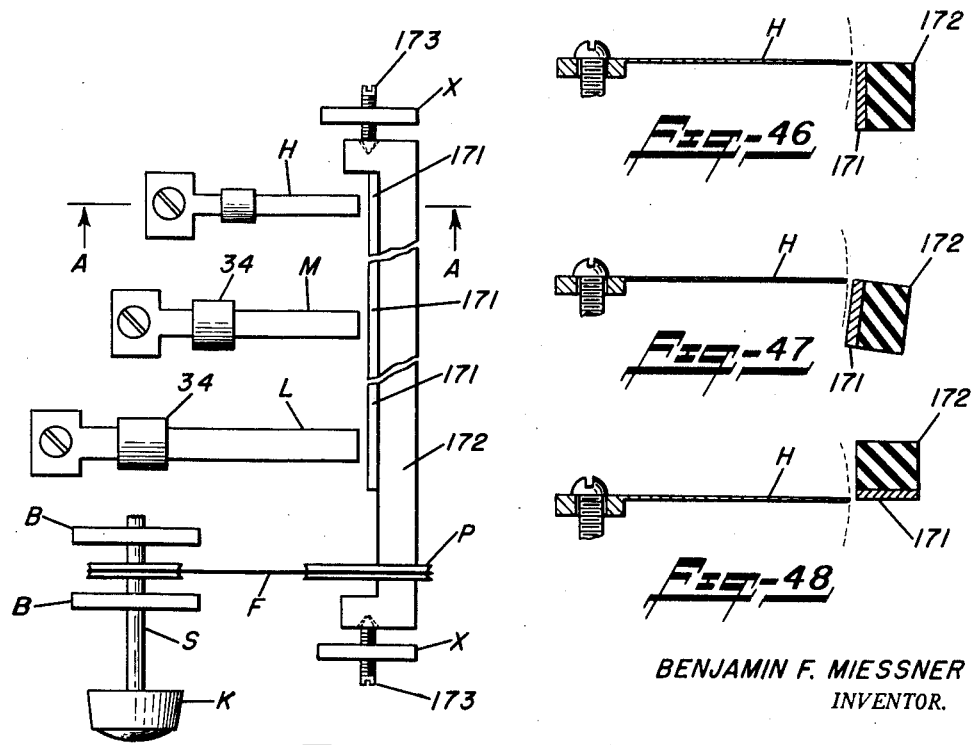
BENJAMIN F. MIESSNER
INVENTOR.
BY Rudolph J. Jurick
ATTORNEY June 12, 1962  B. F. MIESSNER  3,038,363
ELECTRONIC PIANO
Original Filed June 22, 1950  13 Sheets-Sheet 9
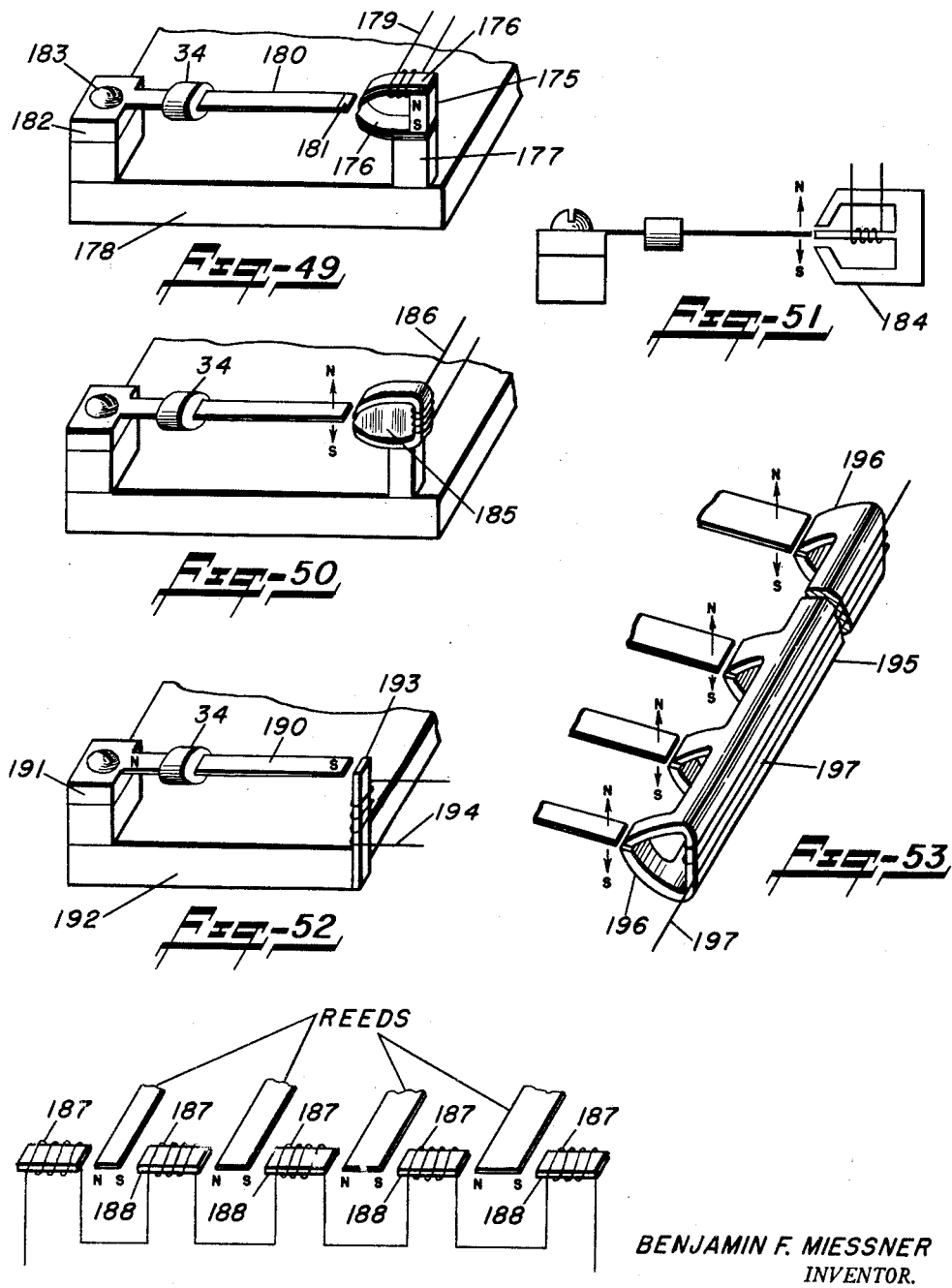
BENJAMIN F. MIESSNER
INVENTOR.
BY Rudolph J. Jurick
ATTORNEY June 12, 1962 B. F. MIESSNER 3,038,363
ELECTRONIC PIANO
Original Filed June 22, 1950 13 Sheets-Sheet 10
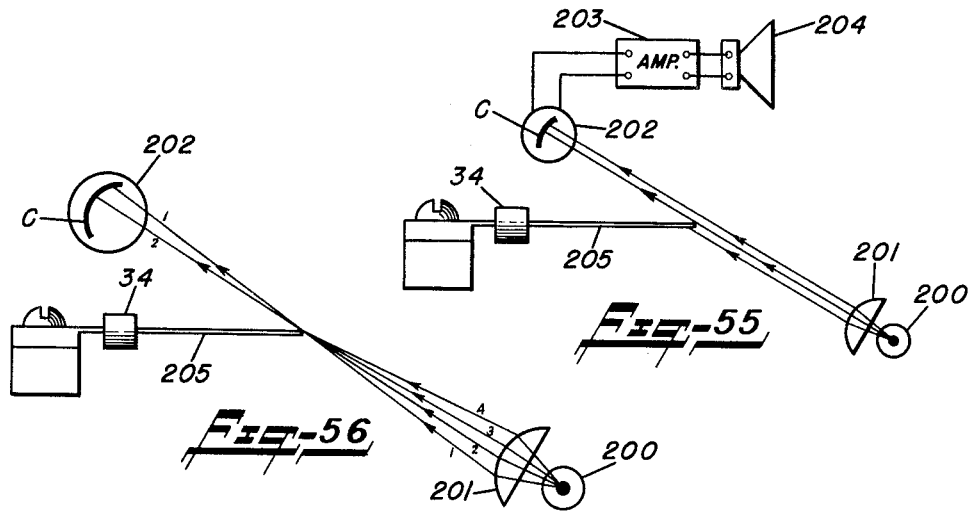
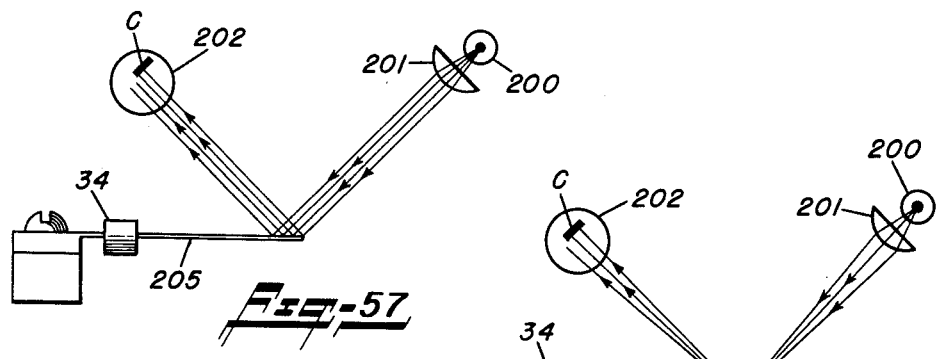
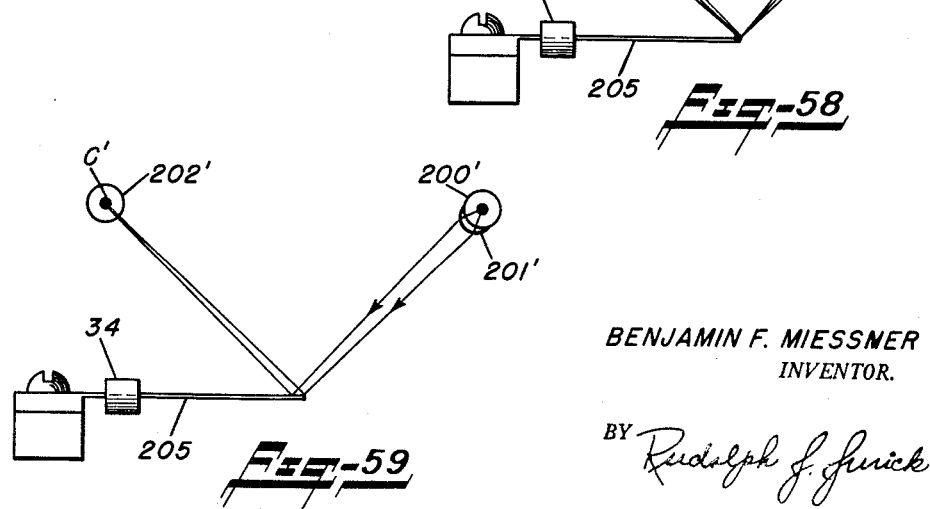
BENJAMIN F. MIESSNER
INVENTOR.
BY Rudolph J. Junick
ATTORNEY June 12, 1962   B. F. MIESSNER   3,038,363
ELECTRONIC PIANO
Original Filed June 22, 1950   13 Sheets-Sheet 11
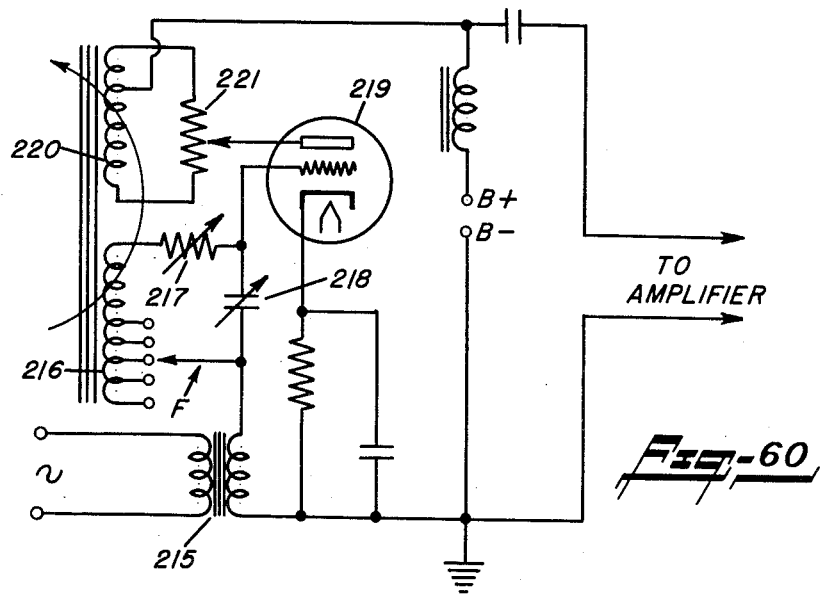
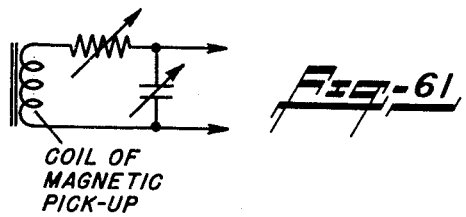
COIL OF
MAGNETIC
PICK-UP
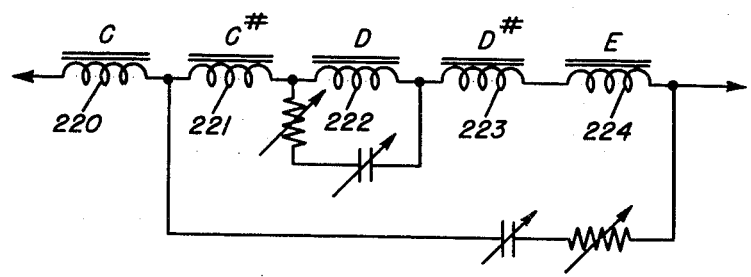
BENJAMIN F. MIESSNER
INVENTOR.
BY Rudolph J. Jurick
ATTORNEY June 12, 1962
B. F. MIESSNER
3,038,363
ELECTRONIC PIANO
Original Filed June 22, 1950
13 Sheets-Sheet 12
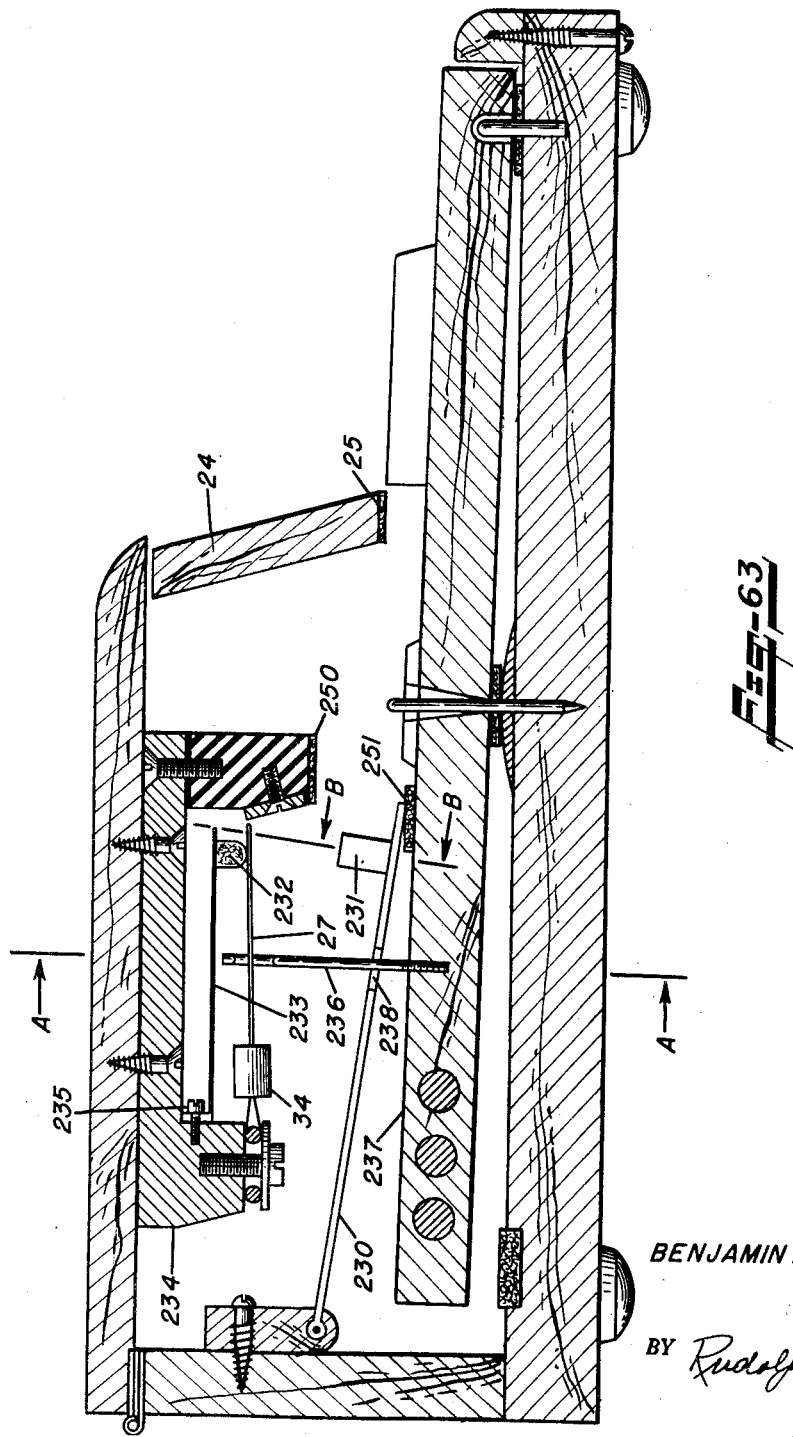
BENJAMIN F. MIESSNER
INVENTOR.
BY Rudolph J. Jurick
ATTORNEY

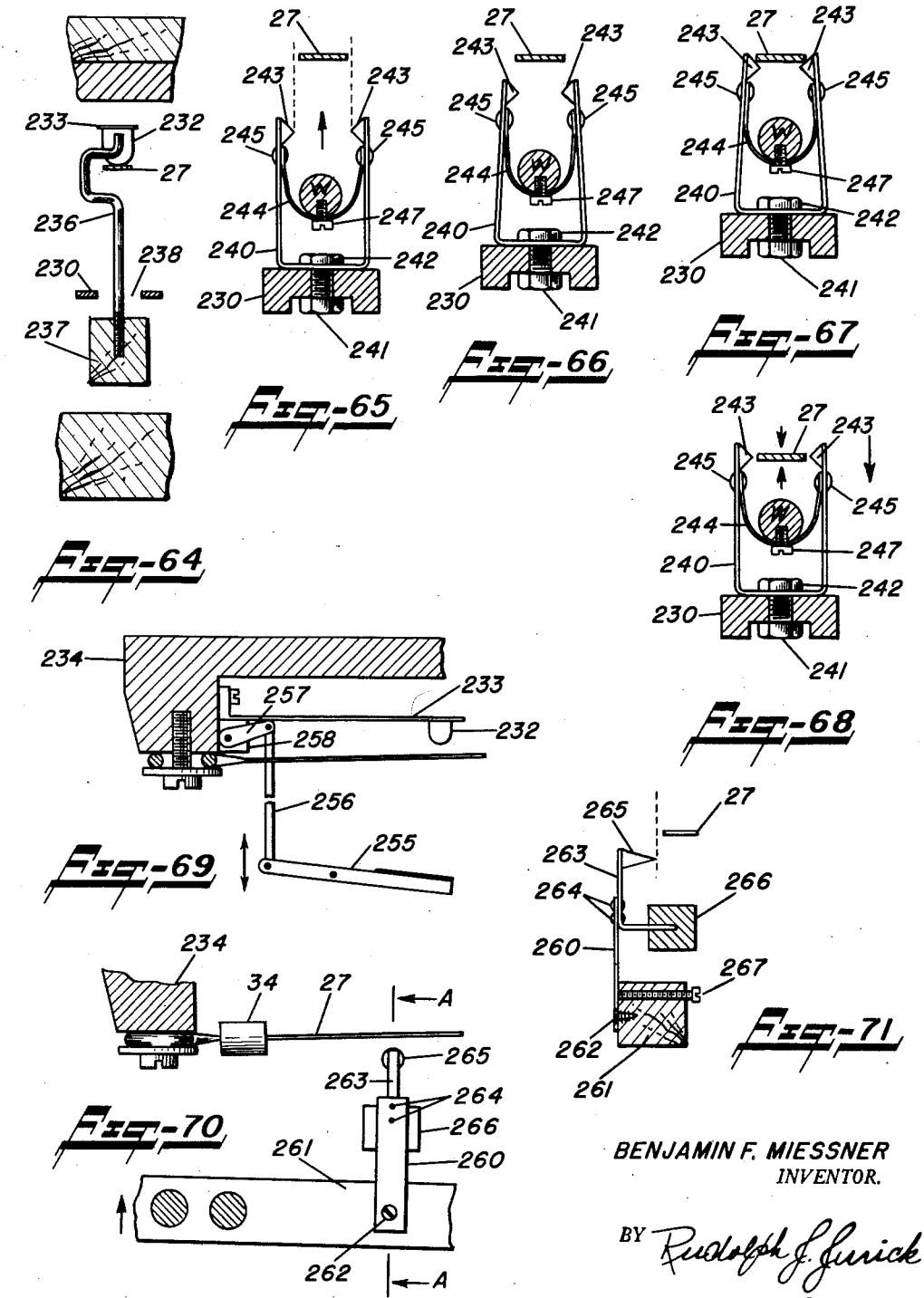

United States Patent Office 3,038,363
Patented June 12, 1962

3,038,363
ELECTRONIC PIANO
Benjamin F. Miessner, Miami Shores, Fla., assignor, by mesne assignments, to The Wurlitzer Company, Chicago, Ill., a corporation of Ohio
Continuation of application Ser. No. 169,714, June 22, 1950. This application Mar. 17, 1959, Ser. No. 799,897
24 Claims. (Cl. 84—1.14)

This invention relates to an electronic musical instrument and more particularly to a novel system and apparatus for producing the characteristic tones of a piano but without the use of strings.

Instruments such as the piano, harpischord, harp and the like produce damped tone vibrations which tones are developed by striking, plucking or otherwise exciting tensioned strings. While the features of my invention are applicable to any instruments of this class, the description will be related to the piano, because of its universal popularity.

In instruments of the impulsively-actuated, tensioned-string family, steel or other strings are used as the vibratory tone generators. The strings are maintained under considerable tension and for exacting musical requirements the strings must be tuned frequently to the frequencies of the equitempered musical scale used by all instruments. The frequency of these strings is affected by:

(1) Minute, gradual elongation with time, especially during the initial period, that is, when the string is first placed under tension;

(2) Temperature variations of the string and its supporting string frame, and of the wood bridge, wood sound board, etc.;

(3) Moisture content variations in the wood bridge, wood sound board, and other wood parts.

Therefore, with changes in temperature and humidity, every tensioned-string instrument undergoes changes which shift the frequencies of the string vibrators and these shifts in the frequency of the individual strings are not necessarily uniform for all strings.

Furthermore, the aggregate string tension may be so great that exceedingly heavy and massive iron or wood structures are required to withstand these forces. For example, in a piano having some 200 strings, each at about 180 pounds tension, the aggregate string tension is approximately 18 tons. Consequently, a grand piano exveeds 1500 pounds in weight and requires a length up to 9 feet to accommodate the long strings required for the low frequencies. Even in small grand and console type pianos the weight may be 500 pounds or more and the height (or length) may be 36 to 40 inches.

Theory discloses that the tensioned string, as a musical tone generator, never attains the theoretically ideal tone in which the overtones are all exactly integral multiples of the fundamental frequency. These overtones, in fact, have been proven to lie higher in frequency than the true, integrally related Fourier partials of theory, and this heightening of frequency increases with the lower relative tension of a given string. Actually, with the normal "beats" method of tuning pianos wherein a first overtone (2nd partial) of a lower tone is used as the fundamental frequency of the next upper octave, there results a scale of fundamental frequencies which becomes progressively more sharp in the upper scale regions. This is due to the slightly sharp frequency relationship between the 2nd partial and the fundamental of any such tensioned string tone.

While in a given tone the 2nd partial is only a little sharp relative to the fundamental, or 1st partial, when this effect is carried through several octaves of progressive tuning, the top treble tone fundamental frequencies are very considerably sharp relative to the fundamental tone frequencies. This effect upsets the tone temperament of the scale. Further, in any given tone the higher the relative number of a given partial of the complex tone spectrum of a single string, the more sharp it is with respect to the fundamental or 1st partial so that the higher partials of a given string are progressively more and more sharp.

In the method of tone production herein disclosed, all of the partials of a given tone are in exact, integral relationship among themselves, so that they are all in exact tune with one another. The partials above the fundamental are derived from such fundamental rather than from a string whose vibration characteristics change with the frequency of individual partials. In this respect the tone produced by my apparatus is musically superior to that of the conventional piano and similar instruments.

Apart from, or in addition to, the above stated feature of providing by electronic means a tone musically superior to that of the conventional piano, there exist the problems of producing, in all respects, a good, pianistic, musical tone controlled by percussively actuated piano keys, utilizing completely the conventional playing techniques used in the piano, and capable of faithfully rendering the available, accumulated piano literature with which musicians are familiar.

Instruments have been proposed having short, small-diameter, low-tensioned strings, with vibratory bridges, or other piano-like vibratory systems coupled tightly to a string system so as to obtain similar actions and reactions—with suitable mechanico-electro-acoustic translating systems. None of these have been fully satisfactory as to the production of the particular type of musical tone well-known and recognized by musicians as realistic piano tone.

A piano tone starts in a particular way with hammer impact and is influenced markedly by the weight, compliance and damping characteristics of the exciting hammer during its very brief period of contact with the string. After the hammer leaves the string, other factors markedly influence the tone quality and damping characteristics. Among these are the material, stiffness, size, length and tension of the string; the mass, stiffness and damping characteristics of the bridge and sound board at various positions; the vibrational characteristics of the piano case parts and their sound conductive and sound radiating coupling to the air; the shape and volume of the more or less confined air chambers which are inherent in the piano structure; the size and disposition of the sound board; etc. For example, the sound board in upright pianos is in a vertical plane where it itself is an acoustic baffle-board which retards the arrival, particularly of low frequency tones, at the listener's ears (in front of the piano) of the negative (air rarefaction) half cycle of a given tone wave from the back side of the soundboard, so that it cancels only to a small degree the positive half cycle compression wave radiated from the front side of the soundboard. In a grand piano the soundboard is disposed in a horizontal plane so that there is but little of this baffle action especially for the lower frequency tones. Here, considerable neutralization for the lower frequency components occurs since the listener's ears are normally near to, or exactly in, the plane of the soundboard, where positive and negative halves of the same wave cycle reach the ears at practically the same instant and at practically equal amplitudes, especially if the top lid of the piano is in the open position.

Another important factor in piano tone quality results from the use of two or more strings for each note. While these multiple string notes employ identical strings as to size, length and tension, and are struck simultaneously by the same hammer, their combined unison tones are never in fixed phase relation, especially with respect to their higher overtones, so that these produce, among themselves, a great many combination or beat tones of varying frequency due to summation and difference effects on the asymmetric human ear. The combined tone, therefore, shifts constantly in quality as it subsides in amplitude. Even for single strings the tone quality shifts constantly as its amplitude subsides due to the various damping influences. Among these are mechanical hysteresis in the string itself, air friction of the vibratory string, mechanical hysteresis in the coupled bridge and soundboard and sound radiation losses from the soundboard. Also, the soundboard is not a flat-frequency responsive device; it has broad resonance frequencies which vary along the bridge from end to end so that it responds more or less to different frequency components of a given string. Its action, in these respects, varies from point to point along the entire bridge so that different individual strings (of the scale of strings) positioned along it and bearing down upon it are responded to in different manners, and the bridge and soundboard react back upon the individual strings in varying manner to change their vibrational characteristics.

The lateral vibrations of piano strings cause modulations of their downward pressure on the bridge. The soundboard is arched upwardly, with its edge restrained from lateral expansion by iron plates plus a massive wood construction, so that the downwardly pressing strings and the upwardly arched soundboard form a normally balanced system of forces. When a string vibrates laterally, therefore, its varying tension causes a varying pressure on the bridge and soundboard, and this then vibrates in a direction perpendicular to its plane. The strings, within their elastic limits, are almost perfect strings, whatever the direction of their lateral motion, vertical or horizontal planar, or constantly varying in orbital, conic-section, curvilinear motion within the cycle. The soundboard, however, may be compared to a very short, stiff spring whose force-displacement curve is non-linear, so that increasing, downward force-modulations cause less and less downward deflections but the upward force-modulations cause more and more, nearly linear, displacements. Thus, the bridge and soundboard constitute an asymmetric device which does not respond linearly to the modulations of the string pressure. The "bearing" of the string on the bridge refers to the small angle of the string axis as it passes over the bridge and down to the hitch pin. For moderate, lateral amplitudes of string vibration this angle is never zero degrees so that whether the string moves up, down, or horizontally, the bridge feels chiefly only a change of downward pressure. It, therefore, has a strong frequency-doubling action on the soundboard and on the string vibration as heard.

For very large amplitudes of string vibration, however, the bearing angle may become zero, or even reversed, so that when the string is vibrating upwardly it will actually pull the soundboard upwardly. Lateral and downwardly directed string motions, however, continue to set up downward motion of the soundboard, as at the lower vibration amplitudes. For orbital string motions then, where the string motion direction is constantly changing, the soundboard response characteristic is also constantly changing and along with it the tone quality as the string amplitude subsides after excitation.

The piano is, indeed, a complex instrument not even today fully understood and its peculiar characteristic tone is the result of this complex nature.

The piano tone must, in general, have a characteristically unique distribution of energy among its partial frequencies and this must vary in a characteristically unique manner as the tone subsides. Further, these characteristics vary in a particular manner through its scale of tones from low bass to high treble. The low bass is very rich in harmonic content due to the great length and relative flexibility of the strings, while the high treble is a relatively simple tone with but a few overtones. In the extreme treble, at over 4,186 cycles per second, the first overtone is 8,372 cycles per second, the second overtone is 12,558 cycles per second and the third overtone is 16,744 cycles per second, which is virtually at the upper hearing limit of the human ear. In addition these overtone frequencies have but low energy due to the shortness and relative stiffness of the string.

Piano strings also develop another system or series of vibrations entirely unrelated to the lateral vibrations ordinarily considered. When the hammer strikes the string a longitudinal impulse is set up in the string which impulse travels to the near and far fixed ends from which it is reflected back to the opposite end where further reflection takes place. This back and forth longitudinal vibration continues in the string until the energy of the vibration is dissipated. It has a fundamental and harmonic partials forming an essentially Fourier series of tone components but this system of tone partials has only a fortuitous relationship with the lateral system of vibrations. It is also much higher in fundamental frequency due to the much higher speed of propagation in the steel wire for longitudinal than for the lateral displacement wave motion of the string. Both, however, are translated into sound by the action of the bridge and the soundboard. The longitudinal vibration is heard by the ear, especially in the lower pitched strings, as a ringing kind of tone superposed on the normal lateral, much lower pitched, vibration tone and can only by chance be harmonically related to it. At the middle and higher pitch registers this longitudinal-vibration tone disappears insofar as the human ear is concerned merely because its pitch rises beyond the range of audibility.

Another entirely foreign part of piano tones is the broad continuous band of frequencies comprising what is termed the piano hammer "thump" or "crack." This is most pronounced in the higher treble tones, is of short duration and is, in effect, a transient. It adds no musical quality to the string tone but, rather, produces only a disturbing impact noise which momentarily blankets the much weaker tone of the string. Since for these higher tone strings the hammer strikes them very near their fixed end, and since the strings are relatively very stiff, the hammer, in effect, strikes an extension of the bridge thereby causing the characteristic, rapidly damped, complex, noise vibration heard as the hammer "thump." This grows lower and lower in amplitude relative to the string tone as the strings become longer and longer. The longer strings are relatively more flexible at the striking point toward the bass end of the scale since the striking point of the hammer is further removed from the end of the string.

Another characteristic of piano tones (in common with percussive tones generally) is that they are more complex at the higher amplitudes, that is, for stronger hammer blows the tone is not only louder but its overtone content is relatively greater than at low loudness levels. At low levels the tone is "smooth," "soft," "round," "sonorous" in quality due to the relatively strong lower partials compared to the weaker and fewer higher partials. At high levels, however, the upper partials increase both in number and in amplitude relative to the fundamental so that the tone becomes somewhat "strident," "wheezy" or "forceful." This is caused by the relatively linear translation of the string vibration by the bridge and soundboard for small amplitudes, and the relative asymmetric translation at high amplitudes which causes doubling and higher order frequency multiplication effects, as previously discussed. In more colloquial English at low volume the tone "purrs" while at high volume it "snarls." These tonal effects are tremendously useful in the expression of musical moods. They are completely absent in the organ and many other instruments whereby such instruments are not nearly as expressive as the piano.

The tone decrement, that is, the rate at which the tone amplitude subsides, varies throughout the range of piano tones. For low frequency tones it is small while for high frequency tones it is large. Furthermore, this rate of tone decay generally obeys the logarithmic low. At high amplitudes of string vibration the damping losses are higher than at low vibration amplitudes. For this reason a loud piano tone decreases very rapidly at first and then more and more slowly as the tone continues. Consequently, a weakly struck string continues its vibration almost as long as a strongly struck one.

Piano literature has all been composed to suit these characteristics of the piano. In general slower moving passages are kept in the bass tonal range because these tones die down at a relatively slow rate. A quick succession of low tones would hardly allow recognition, by the ear, of the individual notes or tones of the series and the whole series of differently-pitched bass tones and would be heard merely as a jumble of clashing tones. Consequently, the bass tones are generally used for sustaining quality to maintain a harmonious background for the more rapid and agile passages devoted to the higher pitched tones. The fastest, and generally the most agile, passages of piano literature are reserved for the quick-acting treble tones. The middle regions are devoted to the moderately fast passages. Actually, the very low tones may continue in audible vibration for 25–50 seconds while the highest tones may last only 1 or 2 seconds.

The piano is also provided with damper (that is, pedal) controls which also alter its performance. The soft pedal in a grand piano may shift the exciting hammers so that only one or two of the trio of unison strings are struck. This reduces both the amplitude and the complexity of the combination tone since there are only one or two instead of three unison or near unison tones. In an upright piano, the length of the hammer stroke is reduced so that a given force imparted to the playing key will produce a weaker tone.

The "sostenuto" pedal of the piano operates a cam mechanism which holds the damper pads away from the strings for those keys which have been struck after the pedal is depressed. This allows such tones to continue free of the dampers while the hands are free to go on with other keys and tones.

The "loud" pedal removes all the dampers from all damper-controlled strings leaving all strings free to vibrate instead of damping each string as soon as the playing key is released. Its use results in maximum loudness but also in much masking of the individual tones. For specific purposes, in the hands of an artist, the loud pedal has many valuable uses. For example, a given chord, or progression of harmonically related tones is much enriched in tonal value because such strings as are not struck by the hammer are free to resonate with components of the struck-string vibrations.

Among the desirable qualities of the highest types of musical instruments, not found in the piano, is variation of the overall quality of its tone. The organ possesses this quality to a high degree because of its use of many different types of tone producers. Electronic organs also possess this very valuable feature, even to a degree much beyond that of a pipe organ, through controlled variations of the electrical circuits whereby the artist has available the entire gamut of musical tone color, each under easy control by a stop tab. Conventional pianos, however, have but one color of tone which must be used for all types of musical literature, irrespective of their moods. This one color tone may, it is true, be varied from strong to weak, that is, from bright to dark, but only with accompanying changes in loudness. It can never be changed to another family of colors or to any one of many colors.

As stated hereinabove, a tensioned string, as a musical tone generator, never attains the theoretically ideal tone in which the overtones are all exactly integral multiples of the fundamental frequency. The present invention makes use of fixed-free, cantilever-beam type of vibrators in the form of small, tuned reeds of novel design and vibration characteristics. These reeds are of small size requiring only small exciting devices whereby I am able to produce an instrument of small size and weight and low cost. The reeds will retain their mass and compliance characteristic constant over long periods of time eliminating all considerations of periodic or subsequent tuning. Associated with each reed is a novel electrostatic magnetic or photoelectric pick-up and electronic translating arrangement whereby my stringless piano produces tones of piano characteristic.

An object of this invention is the provision of a stringless, electronic piano capable of producing the characteristic tones of a piano and employing similar playing techniques.

An object of this invention is the provision of apparatus for producing impulsively-excited string tones without the use of strings.

An object of this invention is the provision of apparatus for producing impulsively-excited string tones having a large and adjustable range of harmonic content.

An object of this invention is the provision of electronic apparatus for producing string like tones having damping rates similar to those of pianos and like instruments.

An object of this invention is the provision of electronic apparatus for producing string-like tones of the impulsively-actuated type with harmonic contents that vary with time in the manners characteristic of the piano and the like.

An object of this invention is the provision of a light weight, low cost, simple, electronic instrument of the piano type but without use of tensioned strings.

An object of this invention is the provision of apparatus for producing tones of impulsively-excited, string-like characteristics in which the harmonic frequencies are exactly integral multiples of the fundamental frequency.

An object of this invention is the provision of impulsively-excited, string tones from the mechanico-electro-acoustic translation of the vibrations of simple, pendular mechanical vibrators.

An object of this invention is the provision of a simple, inexpensive, mechanical vibrator giving essentially simple pendular vibrations.

An object of this invention is the provision of mechanico-electric translating apparatus capable of transforming a simple, pendular mechanical vibration of a vibrator into strongly peaked electrical vibrations or oscillations.

An object of this invention is the provision of electronic apparatus for transforming strongly-peaked electrical oscillations into tones of adjustable harmonic content.

An object of this invention is the provision of an electronic piano provided with arrangements for producing "loud" pedal and "sostenuto" pedal effects identical to such effects available in the best, conventional pianos.

An object of this invention is the provision of a vibratory reed type of electronic piano including vibration dampers of novel construction whereby termination of the reed vibration does not produce a change in the pitch frequency of the reed.

An object of this invention is the provision of a novel vibratory reed construction for a stringless piano.

An object of this invention is the provision of a vibratory reed provided with a visco-elastic tuning damper whereby the second and third vibration partials are harmonic with the fundamental vibration.

An object of this invention is the provision of a vibratory reed provided with a non-energy-absorbing tuner that tunes the second frequency partial to an exact, integral frequency ratio with the fundamental frequency without significant loss of vibration amplitude.

An object of this invention is the provision of a vibratory reed provided with a tuning member that retunes the first and second vibration frequencies to an exactly integral ratio without significant increase in the normal damping rate of the reed and without significant retuning effect upon the higher frequency partials.

An object of this invention is the provision of an electrostatic pick-up and vibratory reed arrangement whereby vibrations of the reed produce asymmetrical modulations of the capacity between the reed and pick-up.

An object of this invention is the provision of a vibratory reed and translating arrangement whereby vibrations of the reed produce a translated voltage or current wave of maximum steepness and minimum rate of decay.

An object of this invention is the provision of an electronic piano in which adjustments of tone quality, tone volume and tone damping are obtained by axial and lateral adjustments of a vibratory reed relative to a suitable pick-up.

An object of this invention is the provision of a stringless piano employing vibratory reeds as tone generators, capacitive pick-up electrodes associated with the reeds and including means selectively operable to vary the angular disposition of the pick-up electrodes with respect to the reeds whereby the character of the capacity modulations between the reeds and pick-up electrodes may be altered at will.

An object of this invention is the provision of a vibratory reed and magnetic pick-up arrangement for producing highly-peaked, asymmetrical voltage pulses in response to reed vibration.

An object of this invention is the provision of an electronic piano employing tuned vibrators as tone producers and photoelectric apparatus for translating vibrations of the tuned vibrator into electrical oscillations.

An object of this invention is the provision of an electronic piano having tuned vibrators as tone producers and including a key-operated plucker for exciting the tuned vibrators.

These and other objects and advantages will become apparent from the following description when taken with the accompanying drawings illustrating several embodiments of the invention. The drawings are for purposes of description and are not intended to define the scope or limits of the invention, reference being had for the latter purpose to the appended claims.

In the drawings wherein like reference characters denote like parts in the several views:

FIGURE 1 is a general, side view, with parts in cross-section, showing the internal arrangement of the parts in an electronic piano made in accordance with this invention;

FIGURE 2 is a fragmentary end view showing the action of the reed vibration dampers in response to depression of the playing keys and an arrangement for producing a "loud" pedal effect;

FIGURES 3 and 4 are fragmentary plan views illustrating an arrangement for producing the "sostenuto" effect;

FIGURE 5 is a side view of three representative reeds each provided with a visco-elastic tuner-damper;

FIGURE 6 is a plan view of the low frequency reed shown in FIGURE 5;

FIGURE 7 is an isometric view of a reed of different construction;

FIGURE 8 is a side view of another type of reed construction;

FIGURE 9 is a composite and exploded view in isometric, of a three-piece reed construction;

FIGURE 10 is a central, longitudinal, cross-sectional view of another reed construction and showing also a tool for securing the reed lug to the reed base;

FIGURE 11 is a side view of a reed with a non-damping type of vibration tuner thereon;

FIGURE 12 is a transverse, cross-sectional view taken along the line A—A of FIGURE 11;

FIGURE 13 is similar to FIGURE 12 but showing a non-damping tuner of another form;

FIGURE 14 is a plan view of a vibratory reed and electrostatic pick-up;

FIGURE 15 is an elevation view of the FIGURE 14 reed and pick-up.

FIGURES 16 and 17 are similar to FIGURE 15 but showing other forms of the pick-up.

FIGURE 18 is an isometric view showing an assembly of reeds of different pitch cooperating with a single electrostatic pick-up.

FIGURES 19 to 21 are longitudinal, cross-sectional views taken along the lines A—A, B—B and C—C, respectively, of FIGURE 18 to show the progressive change in the angle between the various reeds and the face of the pick-up;

FIGURES 22 to 24 are side views of a reed and electrostatic pick-up and showing various positions of the pick-up with respect to the reed end, all positions of the pick-up being such that the face of the pick-up remains normal to the reed axis;

FIGURE 25 illustrates a grounded shield employed in conjunction with the pick-up to increase the abruptness of the capacity changes between the reed and pick-up as the reed vibrates;

FIGURE 26 illustrates a single, pick-up having tooth-like projections cooperating with the individual reeds;

FIGURE 27 illustrates the longitudinal adjustability of the reed relative to the pick-up tooth;

FIGURE 28 illustrates the lateral adjustability of the reed relative to the pick-up tooth;

FIGURE 29 is a curve showing an asymmetrical wave having both odd and even numbered components;

FIGURES 30 and 31 illustrate symmetrical waves having only odd numbered components;

FIGURE 32 illustrates the variation in capacity, due to reed vibration, between the reed and pick-up arrangement such as that shown in FIGURE 22;

FIGURE 33 illustrates the relative amplitudes of the Fourier series partials obtained from three different reeds with individual pick-ups arranged in accordance with this invention, and as obtained from the test set-up as shown in FIGURE 34;

FIGURE 34 illustrates a test set-up for analysing the vibration characteristics of a reed in terms of capacity modulations between the reed and a pick-up;

FIGURES 35 to 39 are isometric views showing other specific forms of the electro-static pick-up;

FIGURE 40 is a side view showing a simple arrangement for adjusting the spacing between the pick-up and the end of the reed;

FIGURE 41 is a side view showing a vibratory reed associated with a bridge type of pick-up;

FIGURE 42 is a front view of the dual pick-up arrangement shown in FIGURE 41;

FIGURE 43 is an electrical bridge circuit useful for increasing the translating efficiency of the capacitive pick-up arrangement;

FIGURE 44 is a wiring diagram of a representative electronic translating system for transducing the modulations in capacity between the vibratory reed and pick-up;

FIGURE 45 is a fragmentary, plan view of an arrangement whereby the performer may alter the angular disposition between the reed and the pick-up to thereby alter tone quality;

FIGURE 46 is a cross-sectional view taken along the line A—A of FIGURE 45 and showing the face of the pick-up electrode lying in a plane normal to that of the reed;

FIGURES 47 and 48 are similar to FIGURE 46 but showing other angular dispositions of the pick-up electrode with respect to the reed;

FIGURE 49 is an isometric view of a vibratory reed and a magnetic type of pick-up having a polarizing magnet;

FIGURE 50 is an isometric view of a magnetic reed and electromagnetic pick-up;

FIGURE 51 is somewhat similar to FIGURE 50 but showing a tri-polar magnetic pick-up;

FIGURE 52 illustrates a magnetic pick-up and reed arrangement wherein the reed is made of magnetic material and magnetized longitudinally;

FIGURE 53 illustrates a magnetic pick-up arrangement wherein the core carrying the electrical pick-up coil has a plurality of discrete poles alined with individual reeds.

FIGURE 54 illustrates a magnetic pick-up arrangement wherein a plurality of series-connected, electrical pick-up coils and individual cores are disposed between adjacent reeds;

FIGURE 55 illustrates a photoelectric arrangement for translating reed vibrations and in which the optical system provides a parallel-ray beam of light;

FIGURE 56 illustrates a photoelectric arrangement wherein the light rays are brought to a focus at the edge of the reed;

FIGURE 57 illustrates a photoelectric arrangement wherein a parallel beam of light-rays is reflected from the surface of the reed;

FIGURE 58 is also a reflected light system but in this case the beam of light rays is brought to a focus on the reed surface;

FIGURE 59 is similar to FIGURE 58 but in this arrangement the light beam is brought to a focus on the cathode of the photocell;

FIGURE 60 is a wiring diagram illustrative of a formant circuit useful for controlling the output tone quality of my instrument;

FIGURE 61 illustrates a resistance-capacitance arrangement for regulating the band width of the mean frequency generated in a magnetic type pick-up;

FIGURE 62 is a circuit representation to illustrate various shunting arrangements of resistors and condensers that may be used to alter the character of the output tone;

FIGURE 63 is similar to FIGURE 1 but showing a key-operated plucker arrangement for setting the tuned reeds into vibration;

FIGURE 64 is a cross-sectional view taken along line A—A of FIGURE 63 to illustrate the mechanical linkage between the playing key and the vibration damper;

FIGURES 65 to 68 are cross-sectional views taken along the line B—B of FIGURE 63 and showing the plucker device in various positions relative to the reed;

FIGURE 69 is a fragmentary view showing a mechanical arrangement for providing a "loud" pedal effect in the plucker arrangement shown in FIGURE 63;

FIGURE 70 is a side view illustrating another type of plucker device for exciting the vibratory reed; and FIGURE 71 is a cross-sectional view taken along the line A—A of FIGURE 70.

Referring now to FIGURE 1, my instrument may be housed in a cabinet comprising a base 20, a back 21 and a lid 22 that is pivotally attached to the back by a hinge 23. The cabinet is substantially closed by a slidably-removable front board 24 having a felt strip 25 cemented, or otherwise secured, along the lower edge, as is common in piano construction. Inasmuch as my instrument does not employ tensioned strings the cabinet can be much smaller and lighter than conventional piano cabinets. In fact, as shown in the drawing the entire device is portable and may be placed upon a table, rubber feet 26 being provided for this purpose. The vibratory reeds 27 are individually secured to a metal reed base 28 that is fastened to the inner surface of the lid by the screws 29, each reed being held in contact with the said reed base by a cap screw 30 and associated washer 31. It may here be stated that the individual reeds have an end formed in a closed loop 32 which, in combination with the cap screw and washer, provides not only a convenient means for mounting the reed but also affords a means for adjusting the angular position of the reed and its spacing from the electrostatic pick-up electrode 33. Each reed carries a tuning-damper 34. A more detailed description of the reed construction and the function of the tuning damper will be given hereinbelow. The pick-up electrode 33 (of which there is one associated with each reed) is secured to an insulating bar 35 by a screw 36, said bar being secured to the reed base 28 by screws 37. A shim 38, of flat or of wedge shape, may be provided (if necessary) to adjust the position of the pick-up electrode with respect to the free end of the reed. It will be noted that the reeds and pick-up electrodes are mechanically attached to the reed base and, therefore, the entire assembly is readily accessible for adjustment, inspection, or replacement of elements by merely raising the hinged lid 22. The electrical circuit for translating the vibration of the reed into electrical variations will be described in detail below.

The keyboard of my instrument is identical to that of the conventional piano (except that all keys are straight), each key 40 being pivotally retained in position by a pivot pin 41 extending upwardly from the cabinet base and passing through a tapered hole in the key. Smooth rocking motion of the key, in response to finger pressure applied to the outer end, is provided by the curved, pivot rail 42 spaced from the key by a resilient washer 43. Excessive lateral motion of the key is prevented by the key guide pin 45 that is secured to the cabinet base and extends into a bore in the key, a resilient stop pad 46 serving to limit its downward motion and to deaden the contact noise when the key is depressed vigorously. A wood strip 47 secured to the base by screws 48 prevents the entrance of foreign objects between the base and the key and also enhances the general appearance of the instrument.

The inner end of the key 40 carries a capstan screw 50 adapted to strike the visco-elastic anti-rebound pad 51 secured to the hammer stem 52 that is pivotally attached to the hammer flange 53 by a pin 54, said flange being secured to the cabinet back 21 by the screw 55. Alternatively, the pad 51 may be mounted on the head of the capstan screw 50, or in an axial recess provided in the head for this purpose. A hammer head 56, made of suitable material, and carried by the free end of the hammer stem, is adapted to excite the reed by striking the tuning damper 34. It will be apparent that when the outer end of the key is depressed, energy imparted to the hammer stem will cause the hammer head 56 to strike the tuning damper 34 of the reed due to its momentum even though the angular motion of the inner end of the key is limited to a predetermined, minimum value. Consequently, the hammer head remains in contact with the tuning damper for a brief instant only after which it returns, by gravity action, and by the spring action of the reed, to the position shown in the drawing. Upon removal of the finger pressure from the key it will rotate in a counter-clockwise direction by reason of the key balance weights 58, of lead, inserted therein. Return of the key to its normal position results in the hammer head 56 coming to rest on the down stop pad 59. The key stop pad 60 cushions the contact between the key and the base 20. I prefer to make the various pads of a visco-elastic material of soft, yieldable composition whose deformation requires energy expenditure and which remains constant over wide changes of temperature and humidity. Such materials as Vinylite, or butyl rubber in soft grades, are satisfactory. These are disclosed in more detail in my United States Patent #2,271,460, issued January 27, 1942.

To terminate the vibrations of the reed I provide a simple and efficient damper consisting of a thin, bent wire 65 carried by a damper rail 66 that is secured in relatively fixed position with respect to the instrument as a whole. The free end of the wire normally contacts the side of the reed 27. The loop portion of the wire extends slightly below the surface of a felt pad 67 affixed to the rail 66 and is adapted to be contacted by the head of a flathead screw 68 carried by the key 40.

The action of the damper mechanism is better illustrated in FIGURE 2, which shows a series of three reeds, dampers and keys, as seen from the inner end of the keys. The keys 40, 40″ are shown in the normal (inner end down) position wherein the flathead screws 68, 68" are spaced from the damper wires 65, 65" and, consequently, the wires 65, 65" will normally be in contact with the side of the respectively associated reeds 27, 27". When the playing key is depressed the inner end of the key rises, as shown by the key 40', causing the flathead screw 68' to strike the bent portion of the damper wire 65'. As the fixed end of the wire is displaced laterally with respect to the point of contact between the wire and the screw head, the wire is twisted out of contact with the associated reed 27'. The adjustment of the reed exciter mechanism is such that the flathead screw 68' removes the damper wire from contact with the reed just prior to the moment of impact between the hammer-head and the tuning damper. Therefore, the reed is set into free vibration and will continue vibrating until the playing key is released. Upon release of the playing key the flathead screw 68 falls away from the wire loop and the damper wire contacts the edge of the reed thereby terminating the vibrations by sliding friction of the reed on the damper wire. This type of damper wire, which may be a wire or a strip, does not change the vibration frequency of the vibrator and the vibration decay time depends upon the pressure exerted by the damper wire against the edge of the vibrator. The decay time is not constant for all reeds and it will be apparent that the dampers associated with the low frequency, bass reeds should be stiffer than those for the higher frequency, treble reeds. By proper bending of the individual dampers associated with specific reeds, the decay time, or damping characteristics, of my instrument can be made equivalent to the same characteristic in a conventional, tensioned-string piano.

An effect corresponding to that obtained when the "loud" pedal of a piano is depressed, is achieved, in my device, by moving the damper rail 66 as a whole, so that the damper wires, while in their normal positions, are spaced from their associated reeds. Mechanisms for accomplishing this are quite apparent to those skilled in the art and, therefore, one such mechanism is shown diagrammatically in the drawing, wherein depression of a foot-pedal 70 causes a movement of the damper rail to the right. Release of the foot-pedal results in a movement of the damper rail to the left in response to the action of the spring 71. A ledge 72 in the damper rail serves as a stop against the fixed member 73 to thereby assure a return of the individual damper wires to a preset, operative position with respect to the individual reeds. The other end of the damper rail slides within the fixed member 74 thereby assuring proper alinement of the rail with respect to the heads of the screws 68, 68', 68", for all lateral positions of the rail. As in a conventional piano, operation of the "loud" pedal permits free, undamped vibration of all reeds struck while the pedal is depressed as well as resonant vibration of all other reeds.

A "sostenuto" arrangement may also be provided. For this, all dampers whose keys are depressed before the "sostenuto" pedal is depressed will be caught and held away from their reeds until the pedal is released, while all other dampers will react normally.

Reference is now made to FIGURES 3 and 4 which are fragmentary, plan views of an arrangement for providing a "sostenuto" effect in my vibratory reed piano. The showings are rather diagrammatic to facilitate an understanding of the mechanism for achieving this effect. As shown in FIGURE 3, the two reeds 27, 27' are of the type shown in FIGURE 1 being secured to the reed base by the screws 30 passing through the loop formed in the reed end (see FIGURE 1). Each reed is provided with a tuning damper 34. The damper wires 65, 65' are pivotally carried by the damper rail 66 and normally engage the edge of the associated reed, as shown. Disposed over the top of the damper rail is a slidable strip 75 that constitutes the working element of the "sostenuto" mechanism. This strip includes a set of fingers 76, 76' and transversely cut notches 77, the latter cooperating with the individual pins 78, that extend upwardly from the damper rail, to assure sliding, linear motion of the strip. A set of springs 79 each having one end secured to the slidable strip 75 and the other end secured to fixed members 80 normally bias the slidable strip against the fixed stops 81. In the normal position of the slidable strip the fingers 76, 76' lie spaced from the damper wires 65, 65' so that these damper wires are free to move in response to the motion of the individual capstan screws 68, 68' (see also FIGURES 1 and 2), as explained hereinabove. If, however, the slidable strip 75 is moved forward, in the direction indicated by the arrow $a$, in response to depression of the "sostenuto" pedal (not shown in the drawing) while one or more playing keys are retained in the depressed position, the fingers 76, 76' are brought forward into the path of travel of the damper wires 65, 65'.

The operative position of the "sostenuto" mechanism is shown in FIGURE 4. In this figure the slidable strip 75 has been brought forward after the playing key has raised the capstan screw 68' associated with the reed 27'. Consequently, the damper wire 65' is caught behind the finger 76' of the slidable strip 75 and, therefore, the damper wire is prevented from returning to its initial position against the edge of the reed 27'. This reed (and all others that may have been activated by depression of the playing keys prior to depression of the "sostenuto" pedal) will vibrate freely. Release of the "sostenuto" pedal permits the slidable strip 75 to move in the direction of the arrows $b$ to its normal, inactive position, as shown in FIGURE 3 thus freeing the damper wires for return to their normal position in contact with the associated reed edge. It will be noted that when the slidable strip 75 is moved forward before the playing key has been depressed the damper wires are free to act in the normal manner. This is shown in connection with the reed 27, FIGURE 4, wherein the finger 76, while extending into the path of travel of the damper wire 65, nevertheless, permits free movement of this damper wire between the limits defined by the reed edge and the adjacent edge of the said finger. Thus, when the capstan screw 68 is raised, in response to depression of the playing key, the damper wire 65 occupies the position shown in FIGURE 4, that is, the free end of the damper wire is moved out of contact with the reed edge whereby the reed may be set into normal vibration. Upon release of the playing key the damper wire returns into contact with the reed edge terminating the vibrations.

It will now be apparent both reeds 27 and 27' may be re-excited by their respective hammers irrespective of whether the "sostenuto" pedal is or is not depressed. Furthermore, the "loud" pedal may also be used in either case to hold all of the damper wires out of the reed-damping position. I, therefore, provide in my novel piano means for providing artistic rendition of piano music in a manner duplicating that available in the conventional, tension-string piano.

As stated above, and shown in the drawings, my invention makes use of fixed-free, cantilever-beam type vibrators in the form of small reeds that are tuned to provide the entire tonal range of the particular instrument. These reeds are securely anchored at one end and are free for unrestricted vibration between the fixed and free end. Their frequency is determined primarily by the length, mass per unit of length, thickness in the direction parallel to the direction of vibration and the material of which they are made. To raise the pitch of a reed, mass may be removed from the free end and for lowering the pitch, the compliance may be increased by grinding the reed to a thinner cross-sectional area at the fixed end. The material per se, the reed area normal to the direction of vibration, heat treatment and other factors relating to the internal structure, determines very largely the damping rate of the vibrations after excitation.

These reeds may be formed into a musical scale by variation of the length with fixed thickness, by variation of thickness with fixed length, by variation of thickness from end to end, by variation of width from end to end, by variation of loading at or near the free end, or by combinations of these variables. For purposes of simplicity the description will be restricted to reed scales in which discrete pitches are produced by variation of only the length of the reed.

Since reeds require, for best results, attachment to a relatively massive support, I prefer to make the reeds of relatively small size. As the reeds vibrate, they exert torsion forces on their support and these torsion forces tend to vibratorily rotate the support. Such support vibration may be communicated to the air as sound waves, or to the enclosing cabinet whose vibration will set up sound waves, both of these effects resulting in the dissipation of energy from the reeds and thus increasing their damping rate. Such vibration may also be communicated to other reeds having one or more partial tones in tune with the excited reed. Such other reeds will be excited resonantly through the vibration coupling, extracting energy from the excited reed. Even with dampers operative on these other reeds they will tend to vibrate resonantly and while the vibration will be absorbed by the dampers and dissipated as heat, the effect, nevertheless, is still extraction of energy from the excited reed.

I, therefore, prefer to use reeds of small mass and stiffness so that the mass and moment of inertia (about the point of attachment to the mounting support) may be reduced to a minimum consistent with the desired degree of damping of the reeds. This degree of damping should fall within the degree of damping range of acceptably good or excellent piano tones. On the other hand, the damping range may, in response to artistic demands, be made smaller or greater, as desired. The exciting devices may also be of small size, weight and space requirements made possible by the small amount of excitation energy required by the very small reeds. Furthermore, such small size reeds will radiate a minimum of direct acoustic sound because of their small area of coupling to the air, and because of the very much smaller vibration of the reed support which, relatively, has considerable air-coupling surface area. Small reeds, therefore, reduce, in general, all essential requirements of space, weight and exciting energy required and thus operate to keep the instrument small, low in weight, inexpensive, and having a very low direct sound output.

The reed material should be one that has a low internal hysteresis for vibration; is free from crystallization under continued vibration; has resistance to oxidation in salt air, and other deteriorating influences; can readily be formed in manufacture; and has ability to withstand slight bending adjustments without breakage. Preferably, the reed should be electrically conductive so that it may be used as a capacitive electrode for a pick-up device. However, for electromagnetic types of pick-up devices the reeds may be made of a material having magnetic properties. Also, for certain types of electrostatic pick-ups, the reeds may consist of a material having good dielectric properties whereby precision plastic molding techniques may be used for their manufacture. Such molded reeds are sufficiently accurate without further tuning adjustments and they may be molded in groups of many such reeds having specific, individual pitches, as in all-plastic harmonicas and accordions.

I have found that berylium copper particularly, and also bronze alloys in spring tempered hardness, are satisfactory in all listed factors and some types of hard silver and nickel-silver alloys are also fairly acceptable.

For pitch scales of 4 to 5 octaves, variations of reed length alone is sufficient for practical musical scale design. For a range of 7 to 8 octaves it is, generally, desirable to vary other factors of pitch control.

Reeds of the type under discussion are poorly suited for the direct production of sound or for the production of good musical tones by use of customary methods of translating its motion, i.e., pick-ups placed on one side or the other of the reed face. This is particularly true when percussive excitation is employed.

No tension string ever attains the ideal called for by classical theory which demands a perfectly flexible strand. Actual piano strings would come much closer to the ideal string were they 50 or 100 feet long in the base section and entirely unloaded. In the theoretically ideal string the partial tone components are all, up to the highest number, exactly integrally related in frequency to the fundamental and follow precisely the mathematical relationships set down by Fourier.

In practice, however, the strings, of even the largest concert grand piano, never attain this ideal because they are not perfectly flexible. This inherent stiffness, as shown by Seebeck and as proven by Schuck, Young and others, sharpens the pitch of each partial component somewhat more or less (depending on the string design) and progressively more so as the partial number increases in numerical value. For example, in a typical F3 piano string the second partial is 0.7 cent sharp (a cent being 1/100 of a semi-tone) while the thirteenth partial is 40.3 cents, or nearly ½ of a semi-tone, sharp. Furthermore, subjective fundamentals derived from neighboring partials have been shown to be as much as 1.4 cents sharp for the first partial and as much as 112.2 cents, or over one semi-tone, sharp for the twelfth partial.

In reed type vibrators, however, none of the partial frequencies are harmonically related and, in addition, there are large gaps in the series of partial tones. If we use Roman numerals to designate the partial number and Arabic numerals to designate the frequency ratios, we may compare the partial frequencies of idealized strings with those of fixed-free vibrators such as reeds.

| Partial Number | I | II | III | IV | V | VI |
| --- | --- | --- | --- | --- | --- | --- |
| Relative Ideal String Frequency | 1 | 2 | 3 | 4 | 5 | 6 |
| Relative Reed Frequency | 1 | 6.27 | 17.5 | 34.4 | 56.9 | 85 |

It is seen that no two partials of the reed have integrally related partial frequencies, which is a requirement for perfect harmony. Further, the partials of the reed are very far apart in frequency at the lower end of the series, and decreasingly so as the partial numbers increase in value. It is obvious, therefore, that when all of the partials of a reed type vibrator are reproduced, either directly or by electronic techniques, the resultant tone is a mixture of wholly inharmonic components. Such vibrators with pick-ups placed at one side of the reed may serve fairly well for tones typical of bells or chimes, in which inharmonic partials are characteristic, but such vibrator is entirely unsuited for use in the production of piano tones by previously known methods. Another reason for this is that, as in a piano and other types of vibrators, the fundamental is always the strongest component (in amplitude) and the higher and higher numbered partials (Roman numerals) decrease progressively in amplitude, generally in inverse relation to the absolute frequency. The second partial II of a reed, which has a frequency of 6.27 times the fundamental, therefore, has an amplitude of vibration of about ⅕ to 1/10 that of the fundamental I, while the third partial III may have a vibration amplitude of only 1/15 to 1/20 of the fundamental partial I.

For my stringless piano I have devised methods for use of vibratory reeds without the introduction of the inharmonic partials inherently characteristic of the reed. I provide combined loading and damping devices in the form of more or less visco-elastic masses, attached by cementing or otherwise, around the reed at critical positions along the axis thereof. This, I have found, effectively eliminates, or reduces to inconsequential magnitude, the amplitude of all partials above III. At the same time the partials I, II and III are returned so that these are brought into harmonic relationship with one another, and, further, the partials II and III are considerably reduced in amplitude. These damper-load devices, which I shall term tuning-dampers, progress in size, length and position, from treble to bass, being shorter and nearer to the reed's fixed end in the treble range. In the upper treble regions where the partials II and III rise toward the upper limit of audibility, such tuning dampers are not required.

FIGURE 5 illustrates three representative reeds of relatively low, medium and high vibration frequencies, with the tuning dampers 34 attached thereto. With the tuning damper attached, the reed acts effectively as a vibrator of preponderantly one frequency, namely, the fundamental. The second partial II is much weaker than normal (without the damper) and the third III partial is very much weaker and hardly discernable, but both partials are harmonious with the fundamental, as shown in the following table.

| Partial Number | I | II | III | IV | V | VI |
|---|---|---|---|---|---|---|
| Relative Reed Frequency: | | | | | | |
| Without Damper | 1 | 6.27 | 17.5 | 34.4 | 56.9 | 85 |
| With Damper | 1 | 5 | 15 | | | |

The higher partials above III are so weak that they are not heard.

What is desired here is a vibrator having but one frequency, and which is small, light in weight, inexpensive to manufacture and which is capable of large vibration amplitude, for reasons hereinafter explained. In practice I have found that reeds from 1 to 4 inches in length, .016 inch thick and .096 inch in width are entirely satisfactory for a five octave scale extending in pitch range from F=43.65 to F=1396.9 cycles per second. While the width of the reed does not affect the frequency of vibration, I prefer to make the width an exact multiple of the thickness, and only wide enough to insure vibration in only one direction.

The positions, lengths and weights of the tuner-dampers has been found empirically so that no detailed information can be given for predetermination of these factors. Their adjustment is found by "cut and try" methods with frequent auditory tests to indicate when the correct adjustment has been achieved for a given reed. The criterion for this correct adjustment is a good musical chord of two tones (partials I and II) when the reed is struck very close to its fixed end with a hard, sharp-edged, wooden hammer. This two tone chord is that, for example, between a given C tone and an approximate E tone 2⅓ octaves above the C tone, except that the harmony is better.

FIGURE 6 is a plan view of the low frequency reed shown in FIGURE 5 and illustrates the construction of the reeds involving the use of round rod material which is formed into an eye 83 at one end and which is pressed flat for the vibratory portion 84. The eye end of the reed is the full wire diameter whereas the vibratory portion is pressed to the required width and thickness. The length is obtained by cutting, grinding or etc. As shown in FIGURE 1, the inside diameter of the eye is made to have some clearance, say ½₂″, all around the clamping screw 30 that secures the reed to the reed base 28. Also, the clamping screw should have either a large head to over-reach the eye outside-diameter, or a suitable washer 31 should be employed, to assure very secure clamping for all parts of the eye to the reed base. The round form of the eye cross-section (wire or rod) aids in establishing intimate contact with the reed base, as the eye will flatten slightly when compressed if the reed base material is harder than the reed material, or in the event the reed base is of softer material, such material will be indented by the eye. I prefer a softer material for the eye than the base since the eye, for certain adjustment reasons, must seat securely in various positions, as will be explained in more detail hereinbelow. Reeds of the type described are easily removable and readily adjustable angularly and radially with respect to the clamping screw.

In general, for minimum damping, the reed must terminate in a fixed end of relatively large cross-sectional area and mass and this end must be very securely clamped for intimate, microscopically-vibration-free contact with the reed base which itself should be relatively massive. The rod type reed just described serves very well in these respects.

Another type of reed construction is shown in FIGURE 7 wherein the vibratory portion 86 is obtained by milling or grinding a relatively thick, flat bar of metal leaving the lug portion 87 of original thickness and providing a mounting hole 88 therein. The face of the lug that is to contact the reed base may be serrated to provide teeth 89 for assuring intimate, nonrocking contact therewith. A reed of this construction may also be made by casting or pressing. It is preferable to have the grain, if such exists, extending along the reed axis.

Another type of reed may have a lug of cone-shaped or tapered form as shown in FIGURE 8. Here the tapered lug 90 terminates in a threaded end and the reed is clamped securely within a tapered hole in the reed base 91 by means of a nut 92 and washer 93.

The terminal, or lug, end of the reed may be made of two pieces as shown in FIGURE 9. In such design the reed 94 is punched from flat-stock beryllium copper with the wide end crimped by a pressing or forming operation. The opposing faces of the thicker, face plates 95, 96, have pressed into them corresponding corrugations so that the three pieces fit together snugly. Then the three pieces are spot-welded together at the extreme ends so that no microscopic slippage can occur between the reed faces and the face plates when the reed is in vibration and, therefore, no energy dissipation will occur in the reed termination.

Still another type of reed construction and mounting is illustrated in FIGURE 10 wherein the lug portion 98 is of circular cross-section and is fitted into a bore in the reed base 99. A very tight fitting engagement between the lug and the reed base may be obtained by making the bore in the reed base slightly undersize, heating the reed base and cooling the lug, and then pressing the lug into the bore. Upon return to normal temperature, the bore contracts and the lug expands thereby providing intimate and firm contact between the lug and reed base. Alternatively, the lug may be secured by squeezing the reed base material tightly around the lug by means of impact force exerted upon a hollow, tapered, cylindrical tool 100 having a sharp, cylindrical outer edge similar to a round hole punch.

Other methods for constructing the reed may be employed, such as, forging, high-pressure forming, precision casting, drawing, extrusion, rolling, electrodeposition, vaporized spraying, etc. It is important that the reed terminate in a suitable, vibration-free, relatively heavy end section. This is essential not only to prevent chattering (even of microscopic degree) of the reed end relative to the base (which would be communicated to the free end of the reed) but also to insure a minimum damping for the reed's vibration.

By providing vibrators having an essentially sinusoidal vibration without inharmonic partials I have the first essential requirement for the production of characteristic piano tones by electronic means. It may here be stated that I then convert the sinusoidal vibrations of the reed into asymmetrical, highly-peaked electrical waves by proper design and location of the electrical pick-up electrode with respect to the reed. These electrical, peaked waves are, in turn, electronically treated to produce audible tones of selectively variable quality, as will be described hereinbelow.

As explained hereinabove, reeds provided with the tuner-damper 34 act effectively as vibrators of preponderantly one frequency. The second II and third III partials are harmonious with the fundamental but relatively weak, and the higher partials (above III) are so weak that they cannot be heard. Where it is desirable to include a group of the higher inharmonic partials (similar to those present in conventional piano string tones and caused by longitudinal, molecular vibrations of the string) I provide a tuning-load device which has but little or no damping characteristic.

FIGURES 11 and 12 show one form of such non-damping tuning-load member 101 attached to the vibratory reed 102. The member 101 may be made from a square or hexagonal-shaped wire rod of spring material, such as beryllium copper, and it may be tinned so that after critical adjustment of its position along the reed it may be soldered to the reed without changing its mass or position. As shown, the tuning-load member is symmetrical about the reed center line so that it does not introduce a tendency towards torsional vibration of the reed. The spacing between the inner faces of this dumb-bell-shaped member may be somewhat smaller than the reed thickness so that the thicker reed will spring apart these faces when the member is slidably forced on the reed longitudinally. The square, or hexagonal shaped rod is used to provide a flat, yet very short, contact surface between the tuner-load member and the reed, axially of the reed length.

For a typical steel reed having a fundamental frequency I=142 cycles per second, a length 1⅝ inches, a width of .096 inch and a thickness of .016 inch, I have found that a load of this general type may be made of a piece of brass wire ¾ inch long and .092 inch in diameter. The following tabulated data shows how the partials I and II of this particular reed are affected in frequency by critically-adjusted positions of such a tuning-load along the reed length, measured from the fixed end of the reed.

| Load | Frequency in c.p.s. | | Frequency Ratio of Partials, II/I |
|---|---|---|---|
| | Partial I | Partial II | |
| No load | 142 | 890 | 6.27 |
| Load at ⅛" | 141 | 846 | 6.00 |
| Load at 3/16" | 140 | 700 | 5.00 |
| Load at 7/16" | 138 | 690 | 5.00 |
| Load at 17/32" | 135 | 540 | 4.00 |

The above frequencies were measured to an accuracy of approximately 1% by means of a "beats" method with an audio frequency oscillator. For the exactly integral frequency relationships between the partials I and II a steady state wave pattern was observed on an oscilloscope when the critical position adjustment of the load on the reed was achieved.

As disclosed in my United States Patent No. 2,413,062, issued December 26, 1946, there is no nodal point for the partials I, II, III, IV, and V within a distance of ¼ (one-quarter) of the reed length from its fixed end. Thus, all of these partials will undergo a lowering of frequency when the load is applied within that limit as to position. The greatest relative frequency shift is produced in that partial which has an antinode of vibration at the point where the load is attached, whereas no frequency shift would be produced for any partial having a nodal point at the load-position point. All partials having a vibration amplitude greater than zero at the load-position point will, therefore, undergo a change in frequency when the load is applied. Since partial III is normally 17.5 times partial I in frequency, and since partial IV is 34.4 times partial I in frequency, these partials are so high in frequency and damping rate, and so low in energy, relative to the partial I, that they (even when reduced as much as ½ in frequency by the tuning-load device) are heard principally only as a transient at the beginning of high amplitude reed vibrations.

If, however, the load be so massive, or placed so far from the fixed end, that partial II is lowered to, say, 4 times partial I in frequency, then these higher partials are reduced in frequency to values where they (particularly partial III) become slightly disagreeable in combination with the Fourier series partials generated by the pick-up electrode, resulting in a transient, rough or rasping sound at high reed excitation amplitudes. The pickup arrangements useful in conjunction with my novel, tuned vibrators will be explained in detail hereinbelow. I, therefore, prefer to tune partial II to either 5 or 6 times partial I in frequency, whereby the effect of partials III, IV (and higher reed partials) is strikingly similar to the "ringing" inharmonic transients of the lower pitched tones of piano strings.

Since retuned partial II is, thus, of exactly the same frequency as partials 5 or 6 of the Fourier series of integrally related partials generated by the pick-up, it can cause neither discordance nor amplitude modulation by beats with it. Contrasted with the visco-elastic type of tuner-damper which strongly damps all partials above the fundamental I (and even damps partial I somewhat), this non-absorptive tuning-load 101 leaves all partials undamped, except for internal hysteresis, air damping and other damping factors associated with the reed or its support. The fact that partial I is undamped by the loading member insures an output tone of maximum duration, or minimum rate of decay.

My primary purpose is to secure an essentially pendular reed vibration, to retune partial II to an exact integral frequency ratio with partial I, to reduce the amplitude of partial II, and to wipe out the higher numbered partials. With this type of vibrator and pick-up electrode arrangements to be described, the output tone consists wholly of Fourier-related partials uncontaminated by discordant transient components. Since, however, a group of inharmonic transient components is present in conventional piano tones of the most acceptable type, and since this concept of a good piano tone is firmly established in the minds of musicians, it may be considered preferable to include such transient, dissonant components in my reed vibration in order to reproduce them in the output tone and, therefore, satisfy the generally accepted concept of conventional piano tone. Their inclusion does afford a wider change in output tone quality than is obtainable without them since, for low amplitude reed vibration they are very weak and the output tone is soft and sonorous while at higher and higher reed vibration amplitudes they become more and more strident, thus changing the mood of the tone to a more and more "snarling" type characteristic of the best pianos. The quality and touch-responsiveness of the instrument is thus much widened by a brightening of its quality change with its increase in loudness.

FIGURE 13 is a transverse, cross-sectional view similar to FIGURE 12 but showing a tuning-load member 103 of different form. Here the load member 103 comprises a U-shaped piece of square or hexagonal-shaped wire of spring material. The distance between the inside faces of the legs of the U is somewhat smaller than the width of the reed 102 so that the member 103 will not move relative to the reed when the latter is vibrated during the adjusting procedure. The inside surfaces of the legs may be tinned so that after the critical adjustment of the load member along the reed it may be soldered to the reed without changing its mass or position.

Vibratory reeds of the type described hereinabove, and which are useful in the practice of my invention, may be set into vibration by one of several excitation means, namely, a. Hammer action,
 b. Plectrum action,
 c. Electromagnetic attraction or repulsion,
 d. Electrostatic attraction or repulsion.

In general, the hammer type of mechanical exciter is preferred with reeds having damper tuners, as above described, because such action is essentially a pianistic type familiar in action and feel to all pianists. Also, such action yields better operation for variation of excitation amplitude in response to variable-velocity of key depression. For such actions I prefer to employ the mechanisms disclosed in my prior patents, #1,992,438 issued February 26, 1935; #2,271,460 issued January 27, 1942, and #2,469,568 issued May 10, 1949. These key and hammer actions offer very much simplified mechanical, key-operated, hammer actions well suited to the low kinetic energy requirements of these diminutive reed vibrators, and afford various degrees of perfection of performance. It is desirable for such hammer actions that the hammers fall in a straight line so that the reeds and the reed base must, therefore, be so designed that the correct striking points on the reeds also be a straight line. For this purpose the reed base ends, as well as the reed free ends, fall in suitable curves to conform to this condition. In certain designs, however, the free ends of the reeds may also desirably fall in a straight line so that the pick-up electrodes employed to translate the reed vibrations into electrical oscillations may extend in a straight line. In such case the base ends of the reeds form a more pronounced curve.

I have found that light weight, high velocity hammers are superior to heavy, low velocity hammers for excitation of the vibratory reeds. The travel distance of such high velocity hammers must be large relative to the reed vibration amplitude at the striking point. Also, such hammers deliver an equal amount of kinetic excitation energy to the reed in a much shorter time period and, therefore, the hammer remains in contact with the reed for only a very short period of time. This reduces the damping effect upon the reed vibration which varies directly with the time period during which there is physical contact between the reed and the hammer. It will be apparent the longer path of travel of a high velocity hammer also reduces the antirebound requirements of the hammer mechanism after the hammer has returned to its impelling device which is moved by the playing key. It also permits of better adjustment for insuring hammer contact with the reed for weak key blows. While the FIGURE 1 representation is not intended to show the numerous components drawn to an exact scale, it will be noted that the exciter mechanism comprising the hammer stem 52 and the hammer head 56 are substantially smaller than those of a conventional piano.

In an electronic musical instrument the translating system is active at all times and, consequently, some means must be provided to terminate the reed vibrations except in such instances where the artist purposely desires selected tones to continue after the playing key has returned to the initial position. While on and off dampers of the type used on conventional pianos, and other known instruments, may be used with my vibratory reeds these, in general, are not entirely satisfactory because they alter the pitch of the reed tone as they are applied. Upon release of the playing key and the attendant damper action the tone changes slightly, but objectionably, in pitch as the tone dies out. Furthermore, such dampers are made of soft, yieldable, low-loss material such as felt. Such material sheds fibres in use and these fibres may interfere with the operation of the reeds or their associated pick-up electrodes. Also, for relatively compliant vibrators as the small reeds employed in my device, the felt dampers are slow acting in damper action when the material is too soft and, on the other hand, harder grades of damper material may cause a rattling of the reed as the damper comes into contact therewith. I, therefore, prefer the entirely new type of damper as discussed hereinabove and shown in FIGURES 1 and 2. Such dampers are of simple construction, rugged and inexpensive and they serve to damp out the vibrations as rapidly as desired without changing the vibration frequency of the reed. These damper wires 65, FIGURES 1 and 2, should be made of steel, such as music wire, or flat strip material, and, additionally, may be coated, as by plating, with a very hard material such as chromium for abrasion resistance, protection from oxidation, etc. They are preferably of softer material than the reeds so that they and not the tuned reeds will suffer whatever wear may occur.

Conventional pick-up electrodes as presently used with mechanical vibrators are wholly unsatisfactory for the purposes herein described. Such pick-ups are located to one side of and in the plane of the vibrators vibration and will faithfully translate the mechanical vibration, without distortion and without the addition of other vibrations not present in the vibrator. This has been the object of all such prior vibrator pick-ups and every possible distortion factor has been most carefully avoided. For my purposes, however, such prior arrangements are quite useless. The reason for this is that such arrangements will translate practically only the fundamental partial I of the reed since this is 5 to 10 times partial II in amplitude, and 15 to 20 times partial III in amplitude.

An electronic instrument employing plucked reeds has been disclosed by the prior art. This instrument can produce only dull, simple tones, similar to that of tuning forks, having most of its energy in only one component, i.e. partial I. Whatever amplitude of partials II and III are reproduced by the translating apparatus will be relatively weak and strongly inharmonic since partial II is 6.27 times partial I and since partial III is 17.5 times partial I, in frequency. These results are obtained with the pick-up located near the free end of the reed. If the pick-up be placed closer to and adjacent to the fixed end of the reed the partials above I will be relatively stronger but, since these partials are badly inharmonic with I, the reproduced tone is even worse than before.

The use of plectrum excitation means with prior devices tends to reduce the production of partial components above the fundamental I, especially for those reeds of lower pitch which are loaded. Consequently, such reed tones, while not ruined by inharmonic overtones, are nevertheless dull and uninteresting musically. When such reeds are percussively excited by hammers the production of partials is much more developed, with the obnoxious results above described. This is particularly the case when an already vibrating reed is restruck by its hammer at the moment the reed is moving toward the hammer. In this case, the free end of the reed continues in its vibration direction, which is opposite to the direction of that portion of the reed which receives the hammer blow. Short duration transients of other frequencies are produced until the reed has resumed its own natural mode of vibration. These transients produce very unmusical sounds. Such percussive excitation, therefore, for conventional reeds with conventional translating devices, cannot be used where there is even a moderate requirement for a good musical tone. I omit reference hereto bell type tones which are characterized by a jumble of mostly inharmonic partials unless their vibrators are specially designed to make at least two (or more) of the partials harmonic with one another. Bell tones, generally, are not considered good musical tones.

Some relief, at least as to partials II and III may be obtained from such percussively-excited reeds if the hammer be made to strike the reed at a nodal point for one of the partials and the pick-up be placed opposite to the nodal point of the other partial. When such critical adjustments are made partials II and III disappear because one of them is not excited in the reed due to the hammer striking point, and the other, while excited in the reed will not be translated by the pick-up. Also, reversely phased pick-ups may be used to cancel out an unwanted partial. However, when (as above described) the normal mode of vibration of the reed is completely changed by re-excitation of a vibrating reed at such instant when the direction of motion is opposite to that of the hammer then the aforesaid transient vibrations are produced and the tone is ruined. This is particularly true at high vibration amplitude. Such action may occur very noticeably in one out of 5 or 10 such re-excitations, as in repeating a given tone at short intervals, but this is enough to render unsatisfactory the entire method of tone production, as I have learned by experiment.

Conventional pick-up arrangements, therefore, cannot be used with reed vibrators for the production of piano tones, nor, for that matter, for producing any other type of tone with integrally related partials falling in a Fourier series. If, however, the reeds are provided with damping and loading devices such as the tuner damper 34, described with reference to FIGURE 1, above, and if the percussive excitation be applied to the reed against or near such tuner damper, then the above described objectional transients will not be produced and conventionally located pick-ups may be used. Partials II and III will be reduced considerably in amplitude but they will be harmonic with each other and with partial I so that the electronically reproduced tone (as well as the direct tone if the vibrator be large enough to produce it in useable amplitude) will have some musical value. Since partials III and above are very strongly attenuated by the damping action of the tuner-damper 34 these tones will have only three partials, i.e. I, II, and III, of which I is quite strong and II and III are progressively much weaker. Such tones while considerably better than those having but one partial, and very much better than those with inharmonic partials, are still not sufficiently good for use as piano tones. They may serve useful purposes where relatively dull tones are desired and I wish to make it clear that I may employ conventionally placed pick-ups with my damper loaded reeds for the production of tones of this type, which tones, while not entirely comparable to the characteristic tones of a piano are, nevertheless, better in this respect than tones produced by prior devices.

To produce electronically the characteristic tones of a piano by means of mechanical vibrators I start by making the vibrator such that it produces a sinusoidal vibration that is free of unwanted harmonics and then convert these vibrations into asymmetrical electrical waves having sharp peaks which, in turn, are electrically treated to give the desired audible tones. To accomplish this I provide a new and highly useful type of pick-up electrode used in conjunction with the damper-loaded reeds described hereinabove. These pick-ups, instead of being placed at the side of the vibratory reed, are positioned approximately opposite the reed tip, that is, the free end. They may take many specific shapes for various tone qualities and they may be placed at various positions along or near the arc of travel of the reed tip. I choose these positions for various reasons, not the least of which is that here the desired fundamental partial I is strongest compared to other partials in which I am not interested for the production of piano tones. In general, the pick-ups are very close to the arc of travel of the associated reed tip, say 1 to 10 mils separation. In this position it is never possible for the reed to strike the pick-up, as may occur with pick-ups placed over one side of the reed, in the plane of its vibration. I prefer to so locate the pick-up with respect to the reed that any vibration of the reed other than in the plane of its flat side will have little or no effect upon the translation system. Percussively excited reeds generally vibrate only in the direction of the hammer blow which may be made normal to the flat side. However, as an added precautionary measure, in case there is some small component of vibration normal to the side edge of the reed, I prefer to make such transverse vibration harmonic with the normal vibration by making the reed width an exactly integral number of times its thickness. With reeds so proportioned, the preferred position of the pick-up is opposite the tip or free end of the reed.

As shown in FIGURE 14, which is a plan view of a mounted reed and pick-up, the reed 105 is mounted firmly on the reed base 106 by the screw 107. The pick-up electrode 108 is alined with and spaced from the free end of the reed, it being noted that the pick-up electrode is wider than the reed. In such arrangement the pick-up will not translate any lateral components, or any torsional components that may be present in the reed due to off-normal excitation direction, non-homogeneous reed material non-planar flat sides, or other effects. Thus, the requirement for exact, integral, dimension relationship between width and thickness of the reed is not critical. Any small lateral vibrations of the reed tip change neither the effective distance between the reed and pick-up nor the effective area of the electro-static field between them, so that no translation occurs.

Although the pick-up may present a flat surface to the reed tip, as shown in FIGURE 15, which is a side view of the FIGURE 14 arrangement, I have found that a blunt, wedge-shaped pick-up is preferable for pianistic tones, see FIGURE 16. For some regions of the musical scale the top edge of the pick-up may be rounded in the region of the at-rest position of the reed, as shown in FIGURE 17.

The shape of the pick-up on the side facing the reed tip importantly affects the quality of the reproduced tone, and it acts differently in different parts of the scale of reeds, principally because the amplitude of these various reeds varies from bass to treble. For example, a 3½ inch long, F=43.65 cycles per second reed may vibrate a maximum of one (1) inch overall, while a ⅝ inch long, F=1396.9 cycles per second reed may vibrate only a maximum of $\frac{1}{32}$ inch. The shapes of the individual pick-up electrodes may be varied progressively, if desired, from lowest base to highest treble, in order to secure tone qualities of uniformly pianistic types along the scale, or they may be varied in shape where other than pianistic tone qualities are desired at portions of the scale.

It is not necessary that the pick-ups be made of solid metal blocks since only the side facing the reed tip is predominantly effective as a pick-up electrode. They may be constructed of conductive strips having the flat side facing the reed end, or indeed, of a single strip for all the reeds where independent adjustability of position relative to each reed tip is not required, as where the adjustments are made in the reed itself. When a progressive shifting, along the scale of reeds, for the angle θ between the face of the reed and the face of the pick-up electrode, see FIGURE 15, is desired, the single pick-up strip may be attached to the block that has a face cut at a varying angle to its base, as shown in FIGURES 18 to 21.

As shown in FIGURE 18, the individual reeds 110 are secured to the reed base 111 by the screws 112, said reed base being secured to a base plate 113. The reed base 111 is angularly disposed with respect to the insulating block 114, also secured firmly to the base plate 113 and which has secured to one face the metal plate or strip 115, as by screws 116, that constitutes a common pick-up electrode for all the reeds. Such arrangement results in the free tips of the varying-length reeds falling along a straight line. The face of the insulating block 114 varies progressively from a vertical position at one end thereof whereby the pick-up plate 115 presents a varying-spaced surface to the shorter length reeds. This construction is better illustrated in the cross-sectional views shown in FIGURES 19 to 21. FIGURE 19 is a longitudinal, sectional view through the low frequency or bass reed (line A—A of FIGURE 18) and it will be noted the surface of the pick-up plate 115 is normal to the plane of the reed. In FIGURE 20, which is a cross-sectional view of a shorter, intermediate frequency reed (line B—B of FIGURE 18) it will be noted that the angle between the reed and the plate 115 is increased. In FIGURE 21 (taken along the line C—C of FIGURE 13), the shortest, high treble reed, shows a still further increase in the angle between the reed and the plate 115.

It is important that the pick-up (or pick-ups) be rigidly secured so that it cannot vibrate relative to the reed tip as any such vibration will be translated by the electronic circuit introducing spurious tones or transients into the desired tone. For the same reason both the reed base and the pick-up support must be mounted on a common, very rigid base plate, as shown in FIGURE 1. Should these parts be mounted otherwise, any slight torsional or other vibration of the reed or pick-up mountings would alter the distance between the reed tips and the pick-up and again spurious vibrations will be introduced into and ruin the desired tone. Such objectional effects may readily be introduced when the playing keys are struck. Other objectionable effects such as acoustic feed-back from an included loud speaker may also be produced. Since for this type of vibration all pick-ups are influenced simultaneously, and in aiding phase, the requirement for fixed spacing between the reeds and the pick-ups is very important. Only such variations in spacing as occur with proper reed vibration are desired. By mounting the reeds, reed base, pick-up and pick-up support on a common, relatively heavy base plate, any extraneous vibrations will not result in a relative vibration between the reed tips and the associated pick-ups. Where large sound energies are radiated or conducted to the base plate, as by a loud speaker contained in the same cabinet, the base plate may be vibrationally insulated from the cabinet by well-known means.

While the distance between the reed tip and the pick-up determines the degree of translation efficiency, it also controls to a considerable degree the quality of the output tone since the spacing influences the shape of the capacity-variation curve as the reed vibrates. This spacing must either be determined in advance for each tone for a desired tone quality or amplitude, or the individual spacings must be capable of adjustment either by adjusting the pick-up or the reed. I have found that such adjustment of the reed is preferable because it is simpler and less expensive. Reeds, such as shown in FIGURES 5 and 6, having clearance between the reed lug and the clamping screw (see FIGURE 1) are well suited to this type of adjustment. Other simple methods for adjusting a reed axially will be known to those skilled in this art.

Another very important factor which determines not only the output tone quality, but also the decrement of the output tone, is the position of the top side or edge of the pick-up with respect to the normal, at-rest, position of the reed tip, i.e. the specific location of the pick-up along the arc of travel of the reed tip. This affects the point, along the vibration cycle, at which the capacity between the reed and the pick-up becomes a maximum. It affects the rapidity with which the capacity rises and falls. When exactly opposite the reed tip, or more accurately, when the top edge of the pick-up bisects the end surface of the reed when the latter is in the at-rest position, the reed tip travels past this edge at maximum velocity and more or less tangent to the reed travel arc. This arrangement is shown in FIGURE 22, wherein, as in other similar figures, the air-gap between the reed and pick-up is much enlarged for the sake of clarity. The capacity-variation rate here is consequently maximum for a given spacing between the reed tip and the pick-up. This, in turn, results in a translated voltage or current wave of maximum steepness and a tone quality of maximum complexity, as explained hereinbelow. It is also at this point where the decrement of the reproduced tone is the lowest. Here the translation of the reed vibration continues down to extremely low vibration amplitudes of the reed and the capacity between the reed and the pick-up continues to be modulated by these minute vibrations. As a result of this type of placement, and very small spacing between the reed and pick-up, this arrangement produces long-continuing tones, fully as long or longer than like-pitched piano tones. Such long-continuing tones are utterly unobtainable with conventional pick-up arrangements.

With the position of the pick-up electrode as shown in FIGURE 22 wherein the top edge of the pick-up bisects the end surface of the reed, and the reed vibration is symmetrical on each side of its at-rest position, the fundamental frequency of the translated vibration will have a component double that of the reed fundamental frequency. It, therefore, results in a maximum Fourier series of partials and a minimum damping rate. However, if the pick-up is so placed that its top edge is slightly above the top surface of the reed (as shown in FIGURE 23) or below the bottom surface of the reed (as shown in FIGURE 24) the character of the capacity variation between the reed and pick-up and the decrement of the reproduced tone will be altered. Since, as explained in more detail hereinbelow, this type of pick-up arrangement produces a full complement of exactly integrally related partial frequencies, the adjustment just described is extremely valuable in adjusting the output tone quality as well as the damping rate of this tone. Since these adjustments need only be of small degree to obtain the desired tone quality variations, they may be made by slight bending adjustments of the reed rather than displacement of the pick-up. For this reason it is desirable to use for the reeds a material such as beryllium copper which will undergo these small bending adjustments without breakage. To further increase the abruptness of capacity changes between the reed and the pick-up, a grounded shield 116 may be employed with the pick-up, as shown in FIGURE 25. The pick-up 115 and the grounded shield 116 may be mounted upon an insulating support 117.

A third type of adjustment is also desirable, namely, an adjustment for output tone volume alone. Since the sound output of sound reproducers, such as a loud speaker, is never uniform with varying frequency and constant energy of its electrical input, and since it is very desirable to obtain a uniform loudness for all tones, or a smooth linear shift of loudness from bass (where it is loudest) to treble (where it is weakest) as in a piano, an adjustment of this character is essential. Otherwise the tone loudness from note to note would vary considerably and uncontrollably.

For the immediately above stated adjustment I vary the effective area of the immediately opposite portions of the reed and pick-up by a lateral adjustment of one relative to the other. This is most effectively and easily obtained if the pick-up comprises a comb-like member whose teeth have widths substantially equal to that of the associated reeds. Such an arrangement is illustrated in FIGURE 26.

In FIGURE 26, which illustrates three representative reeds 120, 121 and 122 of different widths, the single pick-up electrode 123 is provided with integral teeth 124. These teeth have widths corresponding substantially to the width of the reed with which the particular tooth is associated. The mounting hole 125 passing through the lug of each reed is somewhat larger than the mounting screw used to secure the reed to the reed base. Such oversize clearance holes permit axial movement of the individual reed to adjust the spacing of the reed tip from the tooth of the pick-up electrode as shown on an exaggerated scale in FIGURE 27 and lateral alinement of the reed with respect to the associated electrode tooth, as shown in FIGURE 28. The axial ajustment effects tone quality and volume, and the lateral adjustment affords a means for matching the volume of individual reeds. Since there are 61 to 88 reeds and pick-ups in a piano, the capacity between a single reed and associated pick-up is but a small part of the total capacity of the entire system. Lateral adjustment of the reed, before clamping the reed with its screw, fixes the capacity variation produced by this reed's vibration compared to that of the other reeds. The loudness of individual reed-produced tones may, therefore, be adjusted for all reeds, greatest loudness being obtained with minimum spacing and exact alinement of the reed with the pick-up. Reduced volume is obtained by lateral adjustment of the reed to one side or the other of the true alined position.

It will now be understood that the three vital adjustments, tone volume, tone quality and tone damping, are all obtainable easily, simply and inexpensively by adjustment of the reed axially, and/or laterally on its mounting and by bending the reed slightly up or down in the plane of its vibration. When these adjustments have been made correctly, as determined by the ear or by instrumental tests, the clamping screws may be tightened and such tonal quality and characteristics remain constant thereafter, barring accidental damage to any of the functional parts.

The above arrangement permits a smooth, pianistic transition from bass to treble tones as to loudness, tone quality and decrement. These are important factors of musical tones. Other factors present in imperfect tones, such as "hammer crack," spurious vibrations occasioned by longitudinal modes of conventional piano strings, etc., may well be forgotten; they are present in imperfect tones only because it has heretofore been impossible to remove them.

Having described a method of providing an essentially pendular vibrator having only harmonious partials and electrostatic pick-up electrodes associated therewith I shall now explain the theory underlying the translation of the essentially single, fundamental vibration frequency of the reed into a maximum of Fourier series spectrum components.

It can be shown by mathematical analysis, or synthesis, that steep wave front pulses generate various harmonic series according to the shape of the pulse or its time rate of change. For example, a wave of the type shown in FIGURE 29 results from the compounding of 30 terms of the series, $$y=2[\sin (x+90°)+\tfrac{1}{2} \sin (2x+90°) +\tfrac{1}{3} \sin (3x+90) \ldots ]$$

Conversely, a pulse shape of this type contains 30 components, even and off, of the Fourier series.

A wave of the type shown in FIGURE 30 is obtained by compounding 15 terms of the series, $$y=2[\sin x+\tfrac{1}{3} \sin 3x+\tfrac{1}{5} \sin 5x \ldots ]$$

Conversely, a wave of this shape contains 15 components, all odd, of the Fourier series.

A wave of the shape shown in FIGURE 31 is also obtained by compounding 15 terms of the series, $$y=2[\sin x+\tfrac{1}{3} \sin (3x+180°)+\tfrac{1}{5} \sin 5x +\tfrac{1}{7} \sin (7x+180°) \ldots ]$$

or $$y=2[\sin x-\tfrac{1}{3} \sin 3x+\tfrac{1}{5} \sin 5x-\tfrac{1}{7} \sin 7x+ \ldots ]$$

Here the phases of alternate terms of the odd-term series are changed by 180°.

While curves 30 and 31 appear very different, both are symmetrical about the axis of variation. Both, therefore, contain only odd numbered harmonics or components, and, because phase relations among the components have little or no bearing on the output tone quality as heard by the ear, they will sound alike.

The FIGURE 29 wave having, by inspection, asymmetry, contains both even and odd terms of the Fourier series. This is the type of capacity variation desired for a good musical tone of the piano class. The FIGURES 30 and 31 waves containing only odd-numbered partials will have a characteristic "hollow" type of sound, suitable for some musical purposes but not characteristic of piano tones.

Piano tones contain odd and even harmonics. Hence, to produce tones of piano quality it is necessary to generate a wave form like that shown in FIGURE 29. In order to secure the maximum of Fourier partials it is necessary to develop highly-peaked variations of capacity so that the pick-up electrode must be designed to produce very rapid changes of capacity as the reed vibrates past it. Furthermore, its action should be asymmetrical so that both odd and even partials will be produced. Still further, the harmonic spectrum should increase in richness with increasing amplitudes of reed vibration, and should become simpler with low amplitude vibration. Also, the pick-up should be sensitive to very small amplitudes of reed vibration in order that the translated tone may have a low decrement. A still further desired effect is a gradually increasing decrement and a gradually decreasing harmonic content with increase in the fundamental tone pitch from bass to treble.

All of these desirable characteristics are provided by my electrostatic transducer. As stated above, I start out with a vibratory reed having an essentially sinusoidal vibration in which the greater part of its own inharmonic partials are entirely eliminated and those remaining (partials II and III) are brought into harmony with the fundamental frequency. Associated with such reed is a novel arrangement of the pick-up electrode whereby sharply-peaked, asymmetrical wave forms are obtained yielding a maximum of Fourier series spectrum components from the single, fundamental frequency.

FIGURE 32 illustrates the variation of capacity between the reed 110 and the pick-up 115 arranged as shown in FIGURE 22. The curve X represents one cycle of reed vibration having an amplitude $\theta$. As the reed moves upward the capacity, curve Y, drops sharply to a minimum value. As the reed returns to the initial, at rest, position the capacity increases and reaches a maximum value when the reed passes just below the at-rest position, after which it again decreases. It will be apparent that with the pick-up arranged as in FIGURE 22 (upper edge of the pick-up bisecting the edge of the reed), even minute amplitude vibrations of the reed will produce sharp capacity variations. Such asymmetrical, highly peaked oscillations produce both odd and even components or Fourier partials.

FIGURE 33 illustrates the relative amplitudes of the Fourier series partials for three tones, namely, the low piano tone of 50 c.p.s., a middle piano tone of 1,000 c.p.s., and the top piano tone of 4,200 c.p.s. These spectrograms of my reed tones were obtained by regenerative, electromagnetic feed back for maintaining the reed vibrations at constant amplitude, as shown in FIGURE 34. This amplitude does not represent the peak, hammer-excited amplitude, but one of moderate value, which, for each of the three tones, produced a moderately complex tone quality. The constant-amplitude vibration mode was arranged to obtain a steady indication on the cathode ray tube of the panoramic, sonic analyser. The exactly-integrally-related, perfectly harmonic partials were generated by the translated capacity modulations with the pick-up electrode 115 spaced about .005 inch from the reed 110 and the reed vibrating about 8 times its thickness in amplitude.

As stated above, an asymmetrical, highly-peaked capacity modulation produces a full complement of odd and even Fourier series partials making for a rich, full tone such as is characteristic of the piano. The complexity, or quality, of the tone is a function of the wave shape which, in turn, is determined by the shape and location of the pick-up relative to the reed.

There is considerable latitude in the design and construction of the specific electrostatic pick-up employed to translate the pendular vibration of the reed into highly-peaked, asymmetrical wave forms to provide the desired Fourier series spectrum for the electronic production of pianistic tones. The pick-up constructions, above described, serve admirably for this purpose as they provide asymmetrical wave forms having both odd and even partials.

Other specific forms for the electrostatic pick-up, to provide asymmetrical wave forms, are illustrated in the isometric drawings of FIGURES 35 to 38 which, it is belived, are self-evident. In FIGURE 38 the pick-up strip has the same curvature as the arcuate vibration path of the reed tip, this curved surface having its center of curvature at or near the fixed end of the reed.

The specific shape of the electrostatic pick-up and its position with respect to the reed tip determines the character and complexity of the generated wave form. As noted above, an asymmetrical vibration of the reed relative to the active, or effective, portion of the pick-up is required to produce both odd and even partials necessary for the production of pianistic tones. However, if a different type of output tone is desired this can be achieved by a different location of the pick-up relative to the reed. For dull tones, conventionally placed screws, plates, etc., may comprise the pick-up electrode, such electrodes being disposed adjacent to one or both flat sides of the reed. For other types of tones the pick-up may comprise a strip of metal having an edge facing the reed end, as shown in FIGURE 39. This arrangement produces abrupt capacity changes but the output wave form is symmetrical about its time axis and, consequently, the wave will include only odd numbered partials such as I, III, V, etc.

FIGURE 40 illustrates a mounting arrangement that facilitates adjustment of the spacing between the reed and the pick-up. The reed 130, carrying the tuner-damper 34, is secured to the reed base 131 which, in turn, is mounted on the base plate 132. The pick-up electrode 133 is soldered or brazed to a metal, leaf-spring 134 having an end secured to the support 136 by the screw 135, said support being mounted on the base plate 132. In this case the leaf spring is relatively thick and exerts good pressure against the tip of the adjusting screw 137 whereby the spacing between the reed and the pick-up may be set to a desired value by merely turning the said screw.

FIGURES 41 and 42 illustrate a bridge type pick-up which can be used with a dielectric reed if the gap between the pick-up plates 150, 151 is small compared to the thickness of the reed. The plates 150, 151 are carried by an insulating strip 152 that is secured to the support 153 by the screw 154. A wire 155 is soldered between the plate 150 and a soldering terminal 156, while a wire 157 is soldered between the plate 151 and a soldering terminal 158 that is secured to the support by a screw 159. The reed 160, or entire groups of such reeds, may be made by a precision plastic molding process, as developed in the mouth organ art, with sufficient accuracy to obviate further tuning thereof. In an arrangement of this type the dielectric reed may vibrate in an electrostatic field between the two sections of the pick-up electrode as shown in my Untied States Patent 2,027,074 issued January 7, 1936. Such dielectric material reeds may also be made conducting by coating the surface with a metal or graphite deposit as is well-known in the art.

For translating the capacity variations between the vibratory reeds and the pick-ups I may utilize various principles of mechanico-electric translation apparatus which energizes suitable amplifiers and sound reproducing devices.

The capacity modulation pick-ups may be used with A.F. translating systems by applying a constant electrical charge across the reed and pick-up and coupling the pick-up capacity to the A.F. system through a suitable high resistance. This arrangement, due to slow leakage, requires a connection to a source of constant D.C. voltage, or must be made self-replenishing by the phenomena of charge separation well-known in electrostatics. Such systems are well-known in condenser microphone practice and need not be further discussed herein.

The capacity modulations between the reed and pick-up may be employed with R.F. amplitude modulation-translation system. In these the modulated pick-up capacity is utilized as a variable resistance in a circuit carrying radio frequency current as shown in my Patent No. 2,140,025, issued December 13, 1938. With such a system the combined pick-up capacities for all reeds may be included as an element in a radio frequency bridge circuit in which the masking effects of non-vibrating reed capacities are greatly reduced by bridge balancing adjustments and the translating efficiency of the vibrated reeds is greatly increased. Such a bridge arrangement is illustrated in FIGURE 43 wherein the capacitance 162 represents the total capacity of the entire series of reeds and associated pick-ups. The capacity values of the other bridge arms can be made substantially equal to that of capacitance 162 and one or all of these capacities may be adjustable to obtain a bridge balance when all reeds are in the at-rest position.

The modulations of the reed-to-pick-up capacity may also be translated by a R.F. phase modulation system as disclosed in United States Patent No. 2,321,370 issued June 8, 1943, to William Dubilier in connection with a condenser microphone for hearing aid apparatus.

The reed-to-pick-up capacity modulations may be translated by a R.F. frequency modulation translation system of the type disclosed in my United States Patent No. 2,273,975 issued February 24, 1942. In this patent I disclose the principles of frequency-modulation, mechanico-electric translating systems for strings, reeds, etc. In my Patent No. 2,319,622, issued May 18, 1943, I show such a system for use with a capacity modulating phonograph pick-up. Translating systems of this type are preferred for the electrostatic pick-ups as applied to my stringless piano employing vibratory reeds. The reason for this preference is the system's exceedingly high translation efficiency, its low A.F. impedance, its simplicity, and its low cost. A single triode vacuum tube, or a double triode tube with one triode section acting as the oscillator-detector and the other serving as an audio amplifier, will deliver very ample signal power for operation of head telephone sound reproducers which may be used with my stringless piano for practice purposes. A following one stage power amplifier is ample for ordinary loud speaker requirements.

FIGURE 44 illustrates, by way of example, a wiring diagram for a frequency modulated electronic system satisfactory for converting capacity modulations between the reed and pick-up into musical tones. The oscillator circuit comprises a three element oscillator tube 163, an inductance coil 164 connected in the output circuit of the tube and variably coupled to a coil 165, a source 166 of plate potential included in the output circuit, and a grid bias resistance 167 common to the input and output circuits. The total capacity which, with the coil 165, forms the tuning circuit of the oscillator includes the variable condenser 168 shunted across that coil the variable condenser 169 connected between the condenser 168 and the pick-up 115, and the capacity between the reed 110 and the pick-up 115. With the coupling of the coil 164 to 165 suitably adjusted in phase and degree, the circuit will oscillate at an average frequency determined by the capacity value of the several condensers and the capacity between the reed and pick-up. Upon vibration of the reed the oscillatory variations of the reed to pick-up capacity will vary oscillatorily the total tuning capacity of the oscillator and hence the frequency of its oscillations. The amplitudes, frequencies, and wave forms of the swings of the oscillator frequency will be directly responsive to the amplitudes, frequencies and wave forms of the reed vibrations as seen by the pick-up system. As explained hereinabove, the vibration of the reed is essentially sinusoidal but the capacity modulations between the reed and the pick-up are asymmetrical and sharply-peaked, resulting in a Fourier series of frequency variations in the oscillator circuit. These frequency-modulated oscillations of the oscillator circuit are made available to a tuned I.F. amplifier by the coil 170 coupled to the coil 165 (or coil 164 if desired). The I.F. amplifier is followed in cascade by a detector (or demodulator), an A.F. amplifier, and a loud speaker or other electro-acoustic translating device.

A more detailed description of the electronic translating system will be found in my United States Patent No. 2,273,975, issued February 24, 1942. The description given above is sufficient for an understanding of the reed-pick-up arrangements for converting mechanical vibrations of the reeds into musical tones.

FIGURE 45 is a fragmentary plan view showing a mechanical arrangement whereby tone quality may be altered by the performer. Here I show three reeds L, M, and H (representative of low, medium and high frequency tones), said reeds carrying the tuner-damper 34. Spaced from the reed tips is a pick-up strip 171 carried by the supporting rail 172, the latter being pivoted for rotation about an axis formed by the pointed bearing screws 173 threaded into stationary members X. A pulley P, rigidly secured to the supporting rail 171, is mechanically coupled to the pulley P', as by a flexible member F, said pulley P' being secured to a shaft S journaled between the bearing blocks B. The outer end of the shaft S carries a knob K. Although the drawing is of a fragmentary character intended to convey an understanding of the principle involved rather than detailed mechanical structure, it will be apparent turning of the knob K will alter the angle between the plane of the reeds and the face of the pick-up strip.

FIGURE 46 is a cross-sectional view taken along the line A—A of FIGURE 44 and shows the face of the pick-up strip 171 normal to the plane of the reed H. FIGURES 47 and 48 illustrate other angular dispositions between the reed and pick-up as established by rotation of the knob K in one direction or the other. It is pointed out that the pivot axis formed by the screws 173, FIGURE 45, coincides with the top edge of the strip 171 adjacent to the reed. Thus, the initial spacing between the reed and the pick-up (when the reed is in the at-rest position) will remain constant for all relative positions of the pick-up strip but the curve of the capacity modulations (when the reed is vibrating) will vary widely from position to position. It is also pointed out that the limits of the angular rotation of the supporting rail 172 and pick-up strip 171 are set so that in no case will the strip or rail extend into the reigon defined by the arc along which the reed tip vibrates.

Other translating systems, than those presented above, for use with the electrostatic pick-up arrangements, will suggest themselves to those skilled in this art. However, it is not to be assumed that my stringless piano is limited to such pick-up arrangements as other translating systems for the sinusoidal reed vibration may be used with good results.

In fact an electromagnetic type of pick-up may be used but such pick-up requires a special design if the full possibilities of my instrument are to be realized. The electromagnetic pick-up offers advantages in that its voltage output is relatively high, but it is more expensive to manufacture. These pick-ups employ magnetic reeds, or at least reeds with magnetic tips, and they are subject to difficulties resulting from the attraction of metal chips and filings to the magnetic poles. Additionally, and importantly, there may be a shifting of the frequency of the reeds at low amplitudes of vibration due to the magnetic attraction between the reed and pick-up structure if this be high in value. This frequency shift may be minimized by use of a very small amount of magnetic material at the reed tip or by reducing the magnetic bias between the pole tips of the pick-up to a low magnitude. This effect may be substantially eliminated if the pick-up is placed adjacent to the face of the reed in the plane of the reed's vibration. Such conventional magnetic pick-ups placed in such conventional location with respect to the reed may be used where very dull types of tones may be desired. The reason why the conventional arrangement of magnetic pick-up and reed produces dull tones is due to the fact that the pick-up must be spaced far enough from the surface of the reed so that the reed cannot contact the pick-up at the strongest vibration amplitude. The pick-up, therefore, responds fairly well to the lowest partial, I, of the reed vibration but practically not at all to the partials II and III which are present to a much weaker degree.

For effective use in the development of the new series of Fourier series partials, above described, a magnetic pick-up must not only be placed at the reed tip (or at the reed edge very near the reed tip) and provided with a weak magnetic bias but, and very importantly, it must develop very steep, voltage pulses as the reed tip sweeps past it. For this purpose I have devised magnetic pick-ups with weak polarizing magnets and very closely spaced pole tips.

One such arrangement is shown in FIGURE 49, wherein the pick-up comprises a relatively weak, permanent magnet 175 having laminated or powdered iron pole pieces 176 secured thereto, the assembly being mounted upon an insulating block 177 which, in turn, is mounted upon a rigid base 178. A pick-up coil 179 surrounds one of the pole pieces. The vibratory reed 180 may be made of magnetic material or, alternatively, the reed may be made of non-magnetic material having a soft-iron tip 181 provided thereon, said reed being secured to the reed base 182 by a mounting screw 183. It will be noted that the magnetic flux-field is of small size and very concentrated. When the reed tip vibrates very close to the pole pieces the flux suddenly rises and falls through the coil carrying member thereby generating strongly peaked voltage waves in the coil. The magnetic attraction of the magnet poles for the reed, or reed tip is of a very low order to prevent undesired modulation of the reed's vibration frequency. This, of course, reduces the amplitude of the voltage wave, compared to that which would be obtained with a stronger magnetic field, so that the design results in a compromise between frequency shift and output voltage. The most important aspect of the pick-up design, other than that stated, is that the external flux-field adjacent to the reed tip is highly contrated close to the pole tips.

An alternative design utilizes a non-magnetically biased pick-up construction in which the entire core and pole piece structure is made of high quality magnetic material such as "Permalloy" having a very high initial permeability. Such material will develop very high magnetic flux concentration in the core and thus relatively high output voltages in the pick-up coil. If the core material saturates readily with low intensity magnetomotive forces applied to its poles, so much the better, since this will accentuate the steepness and abruptness of the flux changes as the reed vibrates. For a pick-up of this type the magnetomotive force must be provided by the reed or some other source close by whose magnetic influence on the pick-up will be modified abruptly by the passage of the reed tip across the pole tip's non-magnetic gap. As shown in FIGURE 50, the pole piece and core structure may be built around a non-magnetic material 185, such as a plastic, which also fills the gap between the pole pieces. Such construction serves to prevent any possible vibration of the pick-up poles and, at the same time, prevents accumulation of foreign particles in the gap. In the illustrated construction, the reed is made of magnetic material magnetized at the tip across the flat surfaces to provide a diminutive magnet having a length equal to the reed thickness and a width equal to the reed width. The external field of such a magnet will be highly concentrated across and around the reed tip end and vibration of the reed generates magnetic impulses in the pick-up core and highly peaked voltage pulses in the coil 186. The entire reed may be made of highly coercive magnetic steel or, if made of ordinary high carbon steel, the reed may be magnetized from time to time merely by sending a strong, direct current through the pick-up coil 186. Where other than magnetic materials are used for considerations such as lower vibration decrement, greater resistance to deterioration, etc., the reed tips only may be made of high quality magnet steel attached to the reed proper as by welding, soldering, brazing, etc.

FIGURE 51 illustrates a tri-polar, magnetic pick-up wherein the electrical pick-up coil is disposed over the center leg of the soft-iron core 184. The air gaps formed by the outer legs of the core and the coil-carrying center leg are of unequal lengths whereby vibration of the magnetized reed produces asymmetrical voltage waves including both odd and even partials, as has been already explained.

FIGURE 52 illustrates another type of magnetic pick-up construction wherein the reed 190 is made of magnetic material and magnetized longitudinally, as indicated by the polar markings N, S. In this case the reed base 191, base plate 192, as well as the core 193 carrying the coil 194, are made of good permeability material providing a low reluctance flux path that is a closed circuit except for the small gap at the reed tip.

Magnetic pick-ups may be of single or multiple reed form. When, as is preferred, all required adjustments can be made by changing the reed position relative to the pick-up, the multiple form of construction offers obvious economies. FIGURE 53 illustrates a multiple pick-up, that is, a unitary pick-up structure having discrete pole pieces associated with the individual reeds. The core 195, which may be solid, or laminated, high quality magnetic material, extends the length of the entire reed complement and includes the discrete, tooth-like pole pieces 196, each alined with an individual reed. A single pick-up coil 197 is wound around the core. The reeds may be magnetized either axially or transversely whereby vibration of one or more of the reeds produces abrupt magnetic flux changes within the core and corresponding peaked voltage pulses in the coil 197.

FIGURE 54 illustrates another multiple arrangement of a magnetic pick-up in which the electrical coils 187 are wound upon individual cores 188, each core being disposed between adjacent reeds having laterally magnetized tips as indicated by the polar markings N and S. The cores are disposed right at the reed tips whereby all vibration partials of the reed are translated into a corresponding electrical wave yet there is no possibility of the reeds contacting the cores during reed vibrations of any magnitude.

Having set forth the essential requirements for magnetic pick-up arrangements satisfactory for use with my stringless piano, and having illustrated and described several such arrangements, other arrangements and systems will suggest themselves to those skilled in this art.

In addition to the capacitive and magnetic pick-up and translating arrangements already described, I have developed various photoelectric translating systems for use with my reed vibrators and which provide performance of good quality.

The essential requirements for a photoelectric translating system are:

(1) A steady, very narrow light source (or individual such sources for each individual reed) of high light intensity, preferably providing a beam of light rays having a width and thickness comparable to that of the reed (alternatively, a single light source may provide a thin sheet of light rays extending in the general direction of the reed axes and having a span which extends across all reeds of the assembly of reeds);

(2) A photoelectric cell extending the full length of the assembly of reeds, or individual light collectors for guiding the light rays from each individual reed to a single, small area photocell, or individual, small area photocells for each individual reed;

(3) A suitable audio frequency amplifier and sound reproducer.

FIGURE 55 illustrates a photoelectric arrangement wherein the light source 200 and the lens 201 provide a parallel-ray beam of light that strikes the cathode C of the photocell 202. The photocell is connected to a suitable amplifier 203 which in turn drives the loud speaker 204. The vibratory reed 205, carrying the tuner-damper 34, is so arranged that its free end partly intercepts the thin beam of light rays that is projected across the reed to the photocell.

An alternate arrangement of the light beam is shown in FIGURE 56 wherein the lens is so arranged that the light rays are brought to a focus at the edge of the reed from which point they diverge to strike the photocell.

A light-reflecting arrangement may also be employed as shown in FIGURES 57 and 58. In FIGURE 57 the light system provides a parallel beam of light that is reflected to the photo-cell cathode by the reed surface whereas in FIGURE 58 the light rays are focused to a point on the reed surface and then reflected to the photo-cell as a diverging beam.

In the FIGURE 59 arrangement the light source 200′ includes an integral lens 201′ having a focal length such that the beam of light rays are focused upon the surface of the minute cathode C′ of the photocell 202′ after said light rays have been reflected from the surface of the reed.

In any of the above arrangements optical leverage may be used to increase the speed of motion of the light beam as it varies the illumination falling on the photocell cathode with reed vibrations. Known optical systems may be used to suit particular requirements, to improve the light efficiency, and to provide the necessary light beam modulation for small reed vibration amplitudes.

For the light source I prefer a discharge in a capillary, or small diameter, tube to provide small width, high intrinsic brightness and, more importantly, a non-microphonic characteristic. High concentration of such filamentary type light sources increases the photocell output variations in response to on-off modulation of the light beam and provides the small width required for good focusing by the optical system; as contrasted with a microphonically vibratable wire filament. The electrical discharge through a small-bore tube provides great mechanical stability and consequent freedom from vibration which would set up spurious modulations of the light beam striking the photocell. Additionally, the glass envelope surrounding such luminescent discharge may be sufficiently thick to provide a cylindrical lens, as by molding or extrusion (see FIGURE 59) for focusing a thin strip of light rays that eventually strike the photocell. Both the lamp and the photocell may extend the entire length of the reed scale so that but one lamp and one photocell are required.

The beam of light rays must not be modulated at audio frequency since this would introduce a constant, loud hum into the sound output of the piano. Consequently, the lamp must be operated either from a D.C. source or from an A.C. source of sufficiently high frequency, say 20,000 cycles per second or higher. Both the lamp and the photocell must also be mounted rigidly to the reed-supporting base so that there will be no modulation of the light beam striking the photocell other than that due to reed vibration.

Variations in the sharpness of focus of the light rays, and the position of the lamp and/or photocell with respect to the reeds, may be made to vary the tone quality, or complexity or volume as described hereinabove with respect to the electrostatic pick-up arrangements. Also, adjustments of the individual reeds as to lateral, vertical or axial positions may be made to effect such tonal adjustments for reproduced tone quality, loudness and damping.

It will be apparent that with a light source and photocell, as above described, the photoelectric reed-vibration translating apparatus offers a very simple and effective system.

Adjustments of the optical system may be used to alter the width of the flat light beam modulated by the reeds, or the location of the beam with respect to the reed modulation point along, or lateral to, the reed-swing arc, or the cross-sectional shape of the beam. These adjustments will vary the reproduced tone quality. When the beam is thinnest the light interruption will be most abrupt and will result in a harmonically-rich tone. Also, with a thin light beam arranged so that one half of the beam is cut off by the reed when it is in the at-rest position, the tone decrement will be lowest. When a thicker light beam is used the harmonic content of the tone will be less and the tone decrement will be relatively higher. Amplitude voicing may be accomplished by displacing the light beam laterally so that a smaller portion of the total light beam will be modulated by the reed.

Since the outputs of the pick-ups (capacitive, magnetic or photoelectric) are rich in harmonics (partials) I can control the output tone quality of the instrument by employing one or more formant circuits of either low pass, band pass, band suppression or high pass types, with or without regeneration or degeneration in the amplifier circuits. Formant circuits in electronic musical instruments have been employed heretofore. These circuits function to introduce into each successive fundamental cycle of the oscillations passed through them a train of damped oscillations, which train is re-initiated with each new fundamental cycle; the train in the previous cycle having either been substantially entirely damped out or being terminated by the initiation of the new train. The frequency or frequencies of these damped oscillations are normally higher than the fundamental frequency of the oscillations passed through the circuit, but have no necessary harmonic relationship to those fundamental oscillations; nevertheless, since their effect on the oscillations is a strictly recurring one with each fundamental oscillation cycle, the composite output oscillations from the formant circuit may still be resolved wholly into a series of strictly harmonically related components and thus remain a good musical tone. Formant circuits operate electrically in the same manner as various peculiarities in the configuration of, and various resonance cavities in, the air columns of acoustic instruments. However, in acoustic instruments the air cavity characteristics are fixed whereas the constants of the formant circuits may be varied at will to produce desired effects.

A typical such circuit is shown in FIGURE 60. In this circuit the pick-up tone signals are fed to the audio frequency transformer 215, to the formant circuit F (comprising the inductance 216, variable resistor 217 and the variable condenser 218) to the grid of the tube 219. Variably coupled to the inductance coil 216 is another audio frequency coil 220 arranged for varying the inductance between the coils 216 and 220 and, preferably, with provision for reversal of phase from regenerative to degenerative phase as follows. The coil 220 has a mid-tap and a potentiometer 221 connected across the ends. The potentiometer slider permits use of any amount of coil 221 from zero to maximum in either phase, and thus permits any amount of regenerative or degenerative coupling between the plate and grid circuits of the tube.

For regenerative adjustment a band of frequencies whose width is determined chiefly by the resistor 217 and whose mean frequency is determined by the values of coil 216 and condenser 218, are regeneratively increased in amplitude with a damping rate controlled by resistor 217 and with amplitude controlled by the potentiometer 221. For degenerative operation, a band of frequencies whose mean frequency is set by coil 216 and condenser 218, whose decrement and width are set by resistor 217, and whose amplitude suppression is set by potentiometer 221, are suppressed. With the potentiometer set at the mid-point, and resistor 217 set at a high value, but little or no regenerative or degenerative action is obtained so that this arrangement affords a wide variation of these formant effects.

Where desired two or more of such formant-control circuits may be included and operative in different frequency bands to obtain still further tone quality control through an extended frequency range of audio frequency tone signals.

For obtaining further distortion of the simple pendular, sine wave motion of the reed, as developed in the pick-up device, each of the pick-ups such as, for example, the magnetic types hereinabove described, may have connected to it a rectifier device, such as germanium, silicon or other crystals, provided with contact electrodes. Such a rectifier device connected in one phase will allow say the positive peaks of the pick-up to pass with but little reduction in amplitude while the negative peaks will be greatly reduced. If connected in the reverse phase, the positive peaks will be depressed while the negative peaks will pass relatively unimpeded. These rectifiers should be connected across or in series with each individual pick-up for individual tones of the scale to avoid cross-modulation effects in chordal playing, as would be the case if the rectifier is connected across two or more pick-ups.

Another type of tone control is obtained by use of individual condensers across the individual pick-ups for tuning the pick-up inductance coil to a particular formant frequency. A variable, series resistance for regulating the band width of the mean frequency may also be desirable, as shown in FIGURE 61.

Various arrangements and combinations of these shunting circuits can be employed with individual pick-ups, as shown in FIGURE 62 wherein is shown the pick-up coils 220, to 224 of the individual magnetic pick-ups associated with reeds corresponding to the notes C, C#, D, D# and E respectively.

Furthermore, if desired, simple resistors may be used across single pick-ups, or groups of pick-ups, to regulate their tone voltage amplitudes as for amplitude voicing and the like.

Thus far I have described in detail a stringless piano employing hammer excitation of the vibratory reeds. While this type of excitation is preferred I have also developed a simple plucker excitation mechanism that is responsive to key-touched, that is, velocity of key depression.

FIGURE 63, which is similar to FIGURE 1, illustrates an inertia and momentum type of plucker. In this case the pivoted hammer stem 230 carries the plucker device 231 instead of the above described hammer head. A visco-elastic damper 232 normally lies in contact with the face of the reed 27, said damper being carried by a relatively weak, leaf spring 233 that is secured to the reed base 234 by the screw 235. A vertical rod 236 having an end threaded into the playing key 237 and the opposite end slightly spaced from the leaf spring 233 passes through an aperture 238 in the hammer stem. Thus, when the outer end of the playing key is depressed in playing, the rod raises the damper 232 so that the reed is free to vibrate. FIGURE 64, which is a cross-sectional view taken along the line A—A of FIGURE 63, illustrates the off-set in the rod 236 to clear the reed 27.

Reference is now made to FIGURES 65 to 68 for a description of the plucker action, said figures being cross-sectional views taken along the line B—B of FIGURE 63. The plucker comprises a thin, U-shaped, metallic spring 240 secured to the hammer stem 230 by the bolt 241 and nut 242. A pair of rubber, leather or etc., pluckers 243 are carried by the ends of the spring 240 being secured thereto by cement or other suitable means. A thin tape 244, made of flexible material such as Vinylite, is secured at points intermediate the ends of the spring 240 as by the rivets 245 said tape having a weight W secured thereto as by the screw 247, substantially as shown.

FIGURE 65 shows the relative disposition of the plucker components when the hammer stem is in the normal position as shown in FIGURE 63. It will be noted that the spacing between the facing tips of the rubber fingers or pluckers 243 is slightly greater than the width of the associated reed 27. Thus, if the playing key is depressed slowly these pluckers will clear the reed and the reed will not be set into vibration. This effect corresponds to that of a conventional piano. Now, if the playing key is depressed with increased velocity, such velocity is imparted to the plucker device through the hammer stem 230. As the plucker device moves upward the weight W resists upward acceleration, that is, it tends to remain stationary, thereby causing the arms of the U shaped spring to move inward toward each other as shown in FIGURE 66. Consequently, the rubber fingers 243 impart a slight upward deflection to the reed 27, as shown in FIGURE 67. Then, as the weight W gains velocity the arms of the U shaped spring 240 expand such that when the velocity of the weight equals that of the hammer stem 230 the arms will again occupy the normal position, whereby the pluckers 243 clear the sides of the reed. Inasmuch as the reed has been deflected upward before being released by the pluckers 243, the reed is set into vibration. When the hammer stem reaches its extreme upward position by striking the pad 25 (FIGURE 63) carried by the piano front board 24, the weight W continues upward somewhat permitting the side arms of the U shaped spring to spread further apart. As the hammer stem moves to its initial position, after the playing key is released, the arms of the U shaped spring have had time to contract to their normal position and the pluckers 243 clear the reed as the plucker device moves downward. Bouncing of the hammer stem is prevented by the pad 251 carried by the playing key, as shown in FIGURE 63.

It will now be apparent that as the plucker device moves upward, in response to operation of the playing key, the plucker fingers first move toward each other to push the reed upward and then expand with more than normal clearance. At this point (when the fingers 243 are spaced furthest from the reed) the reed is at maximum vibration amplitude. It will also be apparent that with playing key velocity increase the pressure of the plucker fingers against the reed also increases thus increasing the vibration amplitude of the reed. Likewise, with such increased vibration amplitude of the reed, the fingers 243 spread further apart, following release of the reed, due to the increased upward momentum of the weight W, thus assuring positive clearance of the reed as the plucker device moves downward to its initial position. The Vinylite, or other visco-elastic tape 244, in which the weight W is slung, strongly resists any tendency toward oscillation of the arms of the U shaped spring 240 as such material has high visco-elasticity to bending deformations.

The plucker device is mounted on a flat, pivoted lever arm (hammer stem 230, FIGURE 63) which offers three advantages:

(1) The plucker device is kept alined with the reed so that the plucker fingers exert equal pressure against the reed sides thereby assuring a strictly rectilinear, vertical, vibratory motion of the reed with no torsional vibration.

(2) The pivoted lever arrangement increases the plucker velocity which greatly increases the reliability of the action and decreases its sensitivity to slight misadjustments.

(3) The increased motion of the plucker device substantially increases the vertical clearance between the plucker fingers and the reed for the up and down plucker positions, so that large amplitudes of reed vibrations can be used with no danger of damping contact between the reed and the pads.

The arms of the U shaped spring 240 must be long enough so that in the up position of the plucker there is no possibility of the reed contacting the weight W for maximum velocity of key depression.

While the FIGURE 63 device is sufficiently small so that it can be placed upon any flat surface, such as a table, it is apparent it can be housed in a conventional piano cabinet, either upright or grand. In such case foot-operated pedals may be provided. One such pedal can be the "loud" pedal which permits free, undamped vibrations of the reeds. Such arrangement can be provided with plucker excited reeds as is shown somewhat diagrammatically in FIGURE 69. The pedal is represented by the pivoted lever 255 having a rod 256 pivotally secured to one end. The other end of the rod 256 is pivotally attached to a U shaped bar 257 that has its side arms pivotally secured to a bracket 258. The bracket 258 may be secured rigidly to the reed base 234, or to any other fixed surface of the instrument. When the pedal 255 is depressed the bar 257 raises all the dampers 232, thereby permitting undamped vibration of reeds set into vibration by the playing keys.

FIGURES 70 and 71 show a somewhat simpler plucker arrangement wherein contact with the reed is established only on one edge. The plucker device comprises a thin, flat spring 260 secured to the side of the playing key 261 by the screw 262. An L-shaped, rigid member 263 is fastened to the free end of the flat spring, as by the rivets 264, or soldering, brazing, or etc., said member having a tapered rubber plucker 265 affixed to one end and a weight 266 carried by the offset section, as shown. When the playing key is in the normal, at-rest position the plucker device is so disposed that the tip of the rubber finger 265 is spaced laterally from the side edge of the reed 27, as shown in FIGURE 71. When the playing key is struck the rear end thereof flies upward and the inertia of the weight 266 causes the spring 260 to bend in a clockwise direction such that the rubber finger 265 engages the edge of the reed. Further upward motion of the plucker flexes the reed vertically until the velocity of the weight 266 equals that of the playing key whereupon the spring 260 bends in a counter-clockwise direction thereby freeing the reed suddenly. During the downward, return motion of the playing key and plucker device as a whole, the plucker pad 265 moves clear of the now vibrating reed. It will be apparent this device is also touch-responsive in that the greater the acceleration imparted to the playing key the greater the bending moment applied to vertical spring, and consequently, the greater will be the vibration amplitude of the reed. The set screw 267 permits ready adjustment of the initial, lateral clearance between the rubber pad 265 and the edge of the reed.

In inertia types of touch-responsive, plucker-exciter devices it is apparent that not only do the plucker fingers contract (toward and under the reed edge) more and more with increase key-depression velocities to produce larger and larger reed vibration amplitudes, but that they also expand outwardly away from the reed edges more and more with increasing downward velocity of the released key. In the latter case (key release) the weights W (FIGURES 65 to 68) and 266 (FIGURES 70 and 71) resist downward acceleration and, consequently, they lag somewhat behind the key motion thereby causing the respective fingers of the pluckers to move away from the reed edges or edge.

Having now described my invention in detail the many advantages of my stringless piano, as compared to the conventional, tensioned string piano, may be summarized as follows.

(1) A very substantial reduction in the size of the tone-producing assembly.

(2) A very substantial reduction in the weight of instrument.

(3) A substantial reduction in the cost of producing the instrument.

(4) Selective adjustability of tone quality as by adjustment of the reed and pick-up relative to each other.

(5) Easy adjustability, removability and replacement of individual tone producing elements.

(6) Long, permanently-tuned life of the tone generators as by employing beryllium copper vibrators.

(7) Production of a perfect tone comprising odd and even numbered partials.

(8) Positive and easily adjustable vibration dampers which produce no noise, no distortion of the tone and which shed no lint.

(9) A simple arrangement for producing the "loud" pedal and "sostenuto" effects.

(10) Provision of a low-mass, high-velocity hammer action wherein the hammer rebounds from the reed instantly.

(11) Inasmuch as the Fourier series partials introduced in the pick-ups are exactly integrally related, the original tuning of the reeds by the customary "beats" method does not result in octave stretching as is the case with tensioned strings.

(12) The harmonic output of the tones increases progressively with vibration amplitude.

(13) The harmonic content as produced and as heard by the ear, is progressively greater with change of pitch frequency from highest treble to lowest bass, due to the greater vibration amplitude of lower pitched reeds and to the limitations of the ear at high audio frequencies.

(14) The tone quality is ideal as it is totally devoid of spurious characteristics such as is occasioned by longitudinal modes of string vibrations, and excessive "hammer crack," and more importantly, the amplitudes of the partials fall off with increase in the partial number, yielding a smooth, beautiful tone in which the fundamental is strongest.

(15) The direct acoustic tone output of the reeds is inaudible due to their small area, low mass and low stiffness. The reeds radiate no perceptible sound themselves and the vibrations of the reed base, and the cabinet (which has a much larger air coupling area), are so low in amplitude that they do not radiate sound perceptibly.

(16) The freedom from sound radiating effects is reversible so that the reeds are also free of any appreciable reception of sound radiated by other sources, such as a self-contained loud speaker, thereby eliminating for practical purposes acoustic feed-back.

(17) The absence of direct-radiated reed tones makes the instruments operation inaudible unless the amplifier and speaker are placed into operation. Consequently, the performer, by using head phones, can practice without disturbing others.

(18) Where loud speakers are used the inaudible, direct sound output insures complete control of the instrument tone since the electrical output is completely controllable as to quality and volume.

(19) The tone quality of my instrument changes smoothly from bass to treble getting less complex in the higher frequencies.

(20) The tone quality decreases in complexity with reduction in reed vibration amplitude.

(21) The tone decrement increases smoothly from a very low rate in the bass to a high rate in the upper treble. However, the decrement in the treble is not so high as that in conventional pianos, which is a very desirable feature long sought after by piano manufacturers.

(22) With loud speaker operation any desired level of tone power may be produced depending only on the amplifier and speaker power. Thus, the volume range is from complete inaudibility to that which is many, many times that of a conventional string piano.

(23) Tone quality is adjustable by the performer during actual playing of the instrument.

(24) The sound reproducer can be located remote from the reed and pick-up assembly since the F.M. oscillator output can be radiated or induced into a distant demodulator, A.F. amplifier and loud speaker. Alternatively, the A.F. output of the translator system (located in the cabinet) can be carried via a cable to a reproducer apparatus.

(25) If desired, the F.M. translator tube may be powered by batteries to make a truly portable instrument.

(26) If the frequency of the F.M. oscillator translator be chosen in the F.M. broadcast band, a home type F.M. receiver may be used to receive, demodulate, A.F. amplify, and reproduce the reed vibrations with or without connecting wires. Thus, for practice purposes, the performer may listen with his headphones alone, in which case he adjusts his oscillator frequency above or below the F.M. band of his home receiver so that the receiver is available for normal reception of broadcast programs. Then, if the performer wishes to dispense with the head-phones, or if others wish to hear his playing, he can retune his translator oscillator to some frequency in the F.M. band but which is not occupied by a broadcast station, set his receiver to this frequency, and then listen to his music on his head-phones or through the speaker of the receiver.

(27) For recording or broadcast purposes either the F.M. radio frequency signal or the A.M. output of the reed translator may be fed (the former by radiation, induction or conduction and the latter by conduction or induction) directly to the appropriate channel of the recording or broadcast apparatus, without the intervention of sound-reproducing apparatus such as loud speakers. This reduces overall distortions for such use.

(28) For restricted keyboard models my piano may be made portable so that it can be carried or hung from shoulder straps. In such case the instrument is provided with a battery-operated translating F.M. radio frequency system, and the F.M. receiver may be located anywhere in the room. A capacity type microphone may be included for voice superimposition upon the music.

(29) Since the reeds are low in cost, two reeds per note can be provided. These reeds may be tuned slightly off unison to give a chorus of two unison tones. Additional reeds tuned 7 cycles per second from the true frequencies may also be provided to provide tremolo effects.

The principles involved in the present invention are unique in that they utilize for mechanical reasons of space, weight, excitation requirements and complete freedom from periodic tuning adjustments a type of vibrator which has heretofore been considered absolutely worthless for impulse excitation. Also, because the greater part of the reeds own inharmonic frequency components have been entirely eliminated by the tuner-damper, and the remaining components are brought into harmony with the fundamental and at reduced amplitude, these harmonic reed vibrations are converted into entirely new, musically perfect tones by the shape and disposition of the pick-up electrode. All of this has been accomplished with an apparatus so small, simple, rugged and inexpensive, as to exceed the fondest expectation of men skilled in this field. Well qualified and competent musicians have pronounced the tones produced by my stringless piano not only equal to but actually superior to piano tones of the best types, when judged by a side-by-side comparison. Such musicians recognize the tone superiority but rarely know why these tones are better since they are unacquainted with the physical principles of tones or tone production.

Acoustical physicists, however, need not even hear these tones to pronounce them superior since mere knowledge of the methods used in their production will indicate at once the exactly-integral frequency relationships, the absence of spurious vibration modes, the asence of spurious noise transients, the change in harmonic content from bass to treble, and the smooth decrease in amplitude from low numbered to high numbered partials. These characteristics are confirmed by instrumental measurement data such as spectral analysis of the tone partial systems throughout the pitch range, by means of a sonic analyser. Oscillograms of the complete tones from beginning to end show the damping rates correspond to those characteristic of piano tones throughout the scale.

In summary, my stringless piano produces tones of piano character because:

(1) It yields tones having a harmonic content like that of a piano string;

(2) The harmonic content changes with tone amplitude as does that of a piano;

(3) The decrement of the tone (reduction of amplitude with time) is like that of a piano throughout its pitch range;

(4) It yields tonal dynamics and quality in accordance with a touch-responsive control of vibrator amplitude through a keyboard hammer action.

Additionally, the tone of my stringless piano is musically superior to that of a tensioned string tone because all of its partials are in exact tone harmony with one another.

Having now described in detail my basic invention and numerous embodiments of the individual components as well as functional associations therebetween, variations in the components and arrangements thereof will suggest themselves to those skilled in this art. It is intended that such variations shall fall within the spirit and scope of the invention as set forth in the following claims.

The invention is claimed as follows:

1. In an electrical musical instrument, the combination of a fixed-free vibratory reed and means in spaced relation to a vibratable portion of said reed for translating electric oscillations from its vibrations, said reed having a normally non-integral ratio between the frequencies of its second-partial and fundamental vibrations, and weight means, carried by said reed and effectively centered at a longitudinal point therealong at least substantially within the first quarter of the length of said reed from its fixed extremity, for reducing said non-integral ratio to a lower, integral one.

2. The invention according to claim 1, wherein said weight means comprises a visco-elastic material, whereby the same means both reduces said ratio and damps vibrations of said vibrator.

3. In an electronic piano, the combination comprising a plurality of juxtaposed tuned reeds each of which cantilevers from a supported end thereof to a free end thereof, key controlled hammer means for impulsively exciting said respective reeds for vibration, a single pick-up element for electrostatically sensing vibrations of a multiplicity of said reeds, said pick-up element having a plurality of electrically conductive portions thereof disposed in proximate relation to the free ends of said respective reeds of said multiplicity to provide electrical capacitance between said pick-up element and each reed which is varied by impulse induced vibration of the reed relative to the pick-up element, means for applying a direct current potential between said pick-up element and all of said multiplicity of reeds to charge said reeds to a uniform voltage with respect to said pick-up element, and electronic tone signal means connected to said pick-up element to produce electronic tone signals corresponding to the changing cumulative capacitance between said pick-up element and said multiplicity of reeds coacting therewith.

4. In an electronic piano, the combination comprising a multiplicity of tuned reeds mounted alongside each other in a manner such that each reed cantilevers from a supported end thereof to a free end thereof, key controlled striking means coacting with each of said respective reeds to impulsively excite the reed to vibrate freely in a manner which swings the free end of the reed to opposite sides of a rest position thereof, a single electrostatic pick-up conductor having portions thereof disposed in adjacent relation to the free ends of said respective reeds, each of said pick-up conductor portions registering with the normal position of the coacting reed and being shaped and positioned to extend away from a position of alignment with the normal position of the reed in only one of the two directions in which the reed swings away from its normal position, means for charging all of said multiplicity of reeds to a uniform potential with respect to said pick-up conductor, and electronic tone signal means coacting with said pick-up conductor to produce tone signals controlled by the cumulative capacitance between said conductor and said multiplicity of reeds coacting therewith.

5. An electronic piano comprising a plurality of electrically conductive reeds disposed in side by side coplanar relation to each other and being of progressively varying length, each of said reeds being fixedly mounted at one end and free at its other end, a plurality of hammers one for each reed selectively operable for impulsively exciting the reeds into decadent free vibration, keys for operating the hammers, an electrostatic pick-up comprising a plurality of pick-up portions disposed in side by side coplanar disposition to each other and in a proximate electrically capacitive relation to the projecting portions of said respective reeds, said respective pick-up portions being substantially flush with the normal positions of the respective reeds and extending along the swing of the reeds in only one direction of reed movement away from the normal positions of the reeds, the extent of each pick-up portion in said one direction covering substantially the full excursion of the coacting reed in said one direction, means for charging said pick-up to a substantial electrical potential relative to the coacting reeds, and electronic tone signal means coacting with said pick-up and said reeds to produce tone signals controlled by the electrical capacitance between said pick-up and said reeds.

6. In an electronic piano, the combination comprising a plurality of juxtaposed tuned reeds each of which cantilevers from a supported end thereof to a free end thereof, key controlled striking means for impulsively exciting said respective reeds for vibration, a pick-up for electrostatically sensing vibrations of said reeds, said pick-up including a plurality of electrically conductive portions thereof disposed alongside the vibratory paths of said respective reeds in proximate relation to the normal positions of the respective reeds, to provide electrical capacitance between said pick-up element and each reed which is varied by impulse induced vibration of the reed relative to the pick-up element, means for applying an electric potential between said pick-up and said reeds to charge said reeds to a substantial voltage with respect to said electrically conductive portions of said pick-up, and electronic tone signal means coacting with said pick-up and said reeds to produce electronic tone signals controlled by the instantaneous capacitance between said pick-up and said reeds coacting therewith.

7. An electronic piano as defined in claim 6 in which each of said electrically conductive portions of said pick-up element traverses the free end of the coacting reed and has a width with respect to the reed which substantially exceeds the corresponding transverse width of the coacting reed.

8. In an electronic piano, the combination comprising a multiplicity of juxtaposed tuned reeds each of which cantilevers from a supported end thereof to a free end thereof, key controlled striking means for impulsively exciting said respective reeds for vibration, an integral electrically conductive pick-up plate extending across the free ends of said reeds for electrostatically sensing vibrations of the reeds; said pick-up plate having a plurality of electrically conductive portions thereof disposed in proximate, electrically capacitive relation to the normal positions of said respective reeds to provide electrical capacitance between said pick-up plate and each reed which is varied by impulse induced vibrations of the reeds relative to the pick-up plate; means for applying a substantial electrical voltage between said pick-up plate and said reeds, and electronic tone signal means coacting with said pick-up plate and said reeds to produce tone signals controlled by the cumulative capacitance between said pick-up plate and said reeds.

9. In an electronic piano, the combination comprising a multiplicity of tuned electrically conductive reeds mounted alongside each other in a manner such that each reed cantilevers from a supported end thereof to a free end thereof, key controlled striking means coacting with each of said respective reeds to impulsively excite the reed to vibrate freely in a manner which swings the free end of the reed to opposite sides of a rest position thereof, an electrostatic pick-up including conductor portions disposed in adjacent electrically capacitive relation to the free ends of said respective reeds, each of said pick-up conductor portions being substantially flush with one longitudinal side of the coacting reed when the latter is in its normal position, each pick-up conductor portion being shaped and positioned to extend along the swing of the coacting reed in only one direction of reed movement from the normal position of the reed, the orientation of each reed in its coacting pick-up conductor portion being such that the electrically capacitive spacing between the reed and the conductor portion progressively increases as the reed swings away from its normal position in said one direction of reed movement, means for charging said pick-up to a substantial electrical potential relative to said reeds, and electronic tone signal means coacting with said pick-up and said reeds to produce tone signals controlled by the capacitance between said pick-up and said reeds.

10. In an electronic piano, the combination of a horizontal series of parallel tuned reeds supported in side by side relation to each other in a manner such that each reed cantilevers forwardly in relation to the piano from a supported end of the reed to a free end thereof, a horizontal series of horizontal keys corresponding to said respective reeds and mounted in underlying generally parallel relation to said reeds, a horizontal series of vertically swingable reed striking hammers pivotally mounted between said reeds and said keys and projecting forwardly in underlying relation to the reeds toward the free ends thereof, means connecting said keys to swing said respective hammers upwardly to strike said respective reeds; an integral electrostatic vibration sensing plate extending across the free ends of said reeds and including a plurality of electrical conductor portions disposed in adjacent, electrically capacitive relation to the free ends of said respective reeds; each pick-up conductor portion registering with the normal position of the coacting reed and being shaped and positioned to extend away from a position of alignment with the normal position of the reed in only one of the two directions in which the reed swings away from its normal position, means for charging all of said reeds to a substantial electrical potential with respect to said pick-up plate, and electronic tone signal means coacting with said pick-up plate and said reeds to produce tone signals controlled by the cumulative capacitance between said plate and said reeds.

11. In an electronic piano, the combination of a horizontal series of parallel tuned reeds supported in side by side relation to each other in a manner such that each reed cantilevers forwardly in relation to the piano from a supported end of the reed to a free end thereof, a horizontal series of horizontal keys corresponding to said respective reeds and mounted in underlying generally parallel relation to said reeds, a horizontal series of vertically swingable reed striking hammers pivotally mounted between said reeds and said keys and projecting forwardly in underlying relation to the reeds toward the free ends thereof, means connecting said keys to swing said respective hammers upwardly to strike said respective reeds, an electrostatic vibration sensing pick-up located at the forward ends of said reeds and including conductor portions disposed in adjacent electrically capacitive relation to the free ends of said respective reeds, means for charging said reeds to a substantial electrical potential with respect to said pick-up, and electronic tone signal means coacting with said pick-up and said reeds to produce tone signals controlled by the cumulative capacitance between said plate and said reeds.

12. In an electronic piano, the combination of a horizontal bank of horizontal reeds mounted alongside each other in a manner such that each reed cantilevers forwardly in relation to the piano from a supported end of the reed to a free end thereof, a horizontal bank of piano keys disposed in underlying relation to said reeds, a horizontal series of vertically swingable reed striking hammers pivotally mounted between said reeds and said keys and projecting forwardly in underlying relation to said reeds toward the free ends thereof, means operated by said keys and coacting with said respective hammers to swing the latter upwardly to strike said reeds, a plurality of swingable reed dampers pivotally mounted for movement about horizontal axes and normally engaging the sides of said respective reeds intermediate the ends thereof, damper release means associated with said respctive keys and coacting with said respective dampers to disengage the latter from said reeds upon operation of the keys, an electrostatic pick-up coacting with the forward ends of said reeds and including conductor portions thereof disposed in proximate relation to the normal positions of said respective reeds to provide electrical capacitance between the pick-up and each reed which is varied by vibration of the reed relative to the pick-up, means for charging said reeds to a substantial potential relative to said pick-up, and electronic tone signal means coacting with said reeds and said pick-up to produce tone signals controlled by the capacitance between said pick-up and said reeds.

13. In an electronic piano, the combination of a horizontal bank of generally horizontal reeds mounted alongside each other in a manner such that each reed cantilevers forwardly in relation to the piano from a supported end of the reed to a free end thereof, a horizontal bank of piano keys disposed in underlying relation to said reeds, a horizontal series of vertically swingable reed striking hammers pivotally mounted between said reeds and said keys and projecting forwardly in underlying relation to said reeds toward the free ends thereof, means operated by said keys and coacting with said respective hammers to swing the latter upwardly to strike said reeds, an electrostatic pick-up at the forward ends of said reeds and including pick-up conductor portions thereof disposed alongside the vibratory paths of said respective reeds in proximate relation to the normal positions of said respective reeds to provide electrical capacitance between the pick-up and each reed which is varied by vibration of the reed relative to the pick-up, means for charging said reeds to a substantial potential relative to said pick-up, and electronic tone signal means coating with said reeds and said pick-up to produce tone signals controlled by the capacitance between said pick-up and said reeds.

14. In an electronic piano, the combination of a horizontal bank of generally horizontal reeds mounted alongside each other in a manner such that each reed cantilevers forwardly in relation to the piano from a supported end of the reed to a free end thereof, a horizontal bank of horizontal keys disposed in underlying relation to said reeds, a horizontal series of vertically swingable reed striking hammers pivotally mounted between said reeds and said keys and projecting forwardly in underlying relation to said reeds toward the free ends thereof, means on said keys for swinging said respective hammers upwardly to strike said reeds, a plurality of reed dampers normally engaging said respective reeds, damper release means associated with said respective keys and coacting with said respective dampers to disengage the latter from said reeds upon operation of the keys, electrical pick-up means disposed between the vibratory paths of adjacent reeds, and electronic tone signal means coacting with said pick-up means to produce tone signals controlled by the pick-up means.

15. In combination in an electrical musical instrument, a vibrator comprising a fixed-free reed, said reed comprising an elongated metal strip having a width many times its thickness, said reed inherently tending to vibrate with a fundamental frequency and a plurality of inharmonic partials and with no true harmonics, an impulse exciting means adjacent the reed and engageable therewith for setting it into decadent free vibration, means including a weight adjustably positioned on the reed adjacent the fixed end thereof for rendering the frequency of the second partial of its vibration an integral multiple of the frequency of its fundamental vibration instead of an inharmonic partial, and an electric translation pick-up, said pick-up being located adjacent and being vibratorily passed by a portion of the reed in its vibratory movement.

16. In an electrical musical instrument, the combination set forth in claim 15 wherein said pick-up has a portion located alongside the reed intermediate the length thereof, vibratorily passed by a side-edge portion of the reed.

17. In an electrical musical instrument, the combination set forth in claim 15 wherein said pick-up has an effective thickness in the direction of reed vibration smaller than the high-amplitude stroke of the adjacent reed portion.

18. In an electrical musical instrument, the combination set forth in claim 15 wherein said pick-up has an effective thickness in the direction of reed vibration smaller than the high-amplitude stroke of the adjacent reed portion, and is offset in said direction from effective alignment with the rest position of said reed portion.

19. In combination in an electrical musical instrument, a plurality of aligned vibrators of progressively increasing length each comprising a fixed-free reed, each said reed comprising an elongated metal strip having a width many times its thickness and each said reed inherently tending to vibrate with a fundamental frequency and a plurality of inharmonic partials and with no true harmonics, a plurality of impulse exciting means adjacent the reeds and selectively engageable therewith for setting them into decadent free vibration, a weight adjustably positioned on each reed for rendering the frequency of the second partial of its vibration an integral multiple of the frequency of its fundamental vibration instead of an inharmonic partial, said weights when in operative position being disposed on said reeds at progressively increased distances from the fixed ends of the reeds, and an electric translation pick-up for each said reed, each said pick-up being located adjacent and being vibratorily passed by a portion of its associated reed during the vibratory movement of the reed.

20. In an electrical musical instrument, the combination set forth in claim 19 wherein the weights progressively farther from the fixed ends of the reeds are of progressively increased size.

21. In an electrical musical instrument, the combination set forth in claim 19 wherein said pick-ups are provided with portions located alongside the reeds intermediate the length thereof, vibratorily passed by side-edge portions of the reeds.

22. In an electrical musical instrument, the combination set forth in claim 19 wherein said pick-ups have an effective thickness in the direction of reed vibration smaller than the high amplitude stroke of the adjacent reed portions.

23. In an electrical musical instrument, the combination as defined in claim 19 wherein said pick-ups have an effective thickness in the direction of reed vibration smaller than the high amplitude stroke of the adjacent reed portions, and wherein said pick-ups are offset in said direction from effective alignment with the rest position of the associated reed portions.

24. In combination in an electrical musical instrument, a vibrator comprising a fixed-free reed, said reed comprising an elongated metal strip having a width many times its thickness, said reed inherently tending to vibrate with a fundamental frequency and a plurality of inharmonic partials and with no true harmonics, an impulse exciting means adjacent the reed and engageable therewith for setting it into decadent free vibration, an electric translation pick-up located adjacent the reed with a portion disposed alongside the reed intermediate the length thereof and vibratorily passed by a side-edge portion of the reed, and means including a weight adjustably positioned on the reed between the fixed end thereof and the portion of the pick-up alongside the reed for rendering the frequency of the second partial of its vibration an integral multiple of the frequency of its fundamental vibration instead of an inharmonic partial.

References Cited in the file of this patent

UNITED STATES PATENTS

| | | |
|---|---|---|
| 922,021 | Morgan | May 18, 1909 |
| 1,950,859 | Midgley | Mar. 13, 1934 |
| 2,085,760 | Loar | July 6, 1937 |
| 2,151,021 | Frohman | Mar. 21, 1939 |
| 2,187,251 | Severy | Jan. 16, 1940 |
| 2,212,292 | Koch | Aug. 20, 1940 |
| 2,220,350 | Purington | Nov. 5, 1940 |
| 2,237,990 | Hewlett | Apr. 8, 1941 |
| 2,254,840 | Demuth | Sept. 2, 1941 |
| 2,271,460 | Meissner | Jan. 27, 1942 |
| 2,368,842 | Kealoha | Feb. 6, 1945 |
| 2,413,062 | Miessner | Dec. 24, 1946 |
| 2,414,886 | Miessner | Jan. 28, 1947 |
| 2,456,321 | Rhodes | Dec. 14, 1948 |
| 2,462,531 | Minshall | Feb. 22, 1949 |
| 2,480,131 | Hammond | Aug. 30, 1949 |
| 2,487,420 | Brown | Nov. 8, 1949 |
| 2,510,094 | Fleury | June 6, 1950 |
| 2,536,800 | Dodd | Jan. 2, 1951 |
| 2,581,963 | Langloys | Jan. 8, 1952 |
| 2,641,153 | Enochs et al. | June 9, 1953 |

FOREIGN PATENTS

| | | |
|---|---|---|
| 4,388 | Great Britain | Mar. 1, 1894 |
| 338,593 | Great Britain | Nov. 24, 1930 |
| 710,480 | France | June 8, 1931 |
| 835,650 | France | Sept. 26, 1938 |
| 860,648 | France | Jan. 20, 1941 |